United States Patent
Doi

(10) Patent No.: US 8,423,274 B2
(45) Date of Patent: Apr. 16, 2013

(54) VEHICLE

(75) Inventor: Katsunori Doi, Tokyo (JP)

(73) Assignee: Equos Research Co., Ltd., Tokyo (JP)

( * ) Notice: Subject to any disclaimer, the term of this patent is extended or adjusted under 35 U.S.C. 154(b) by 458 days.

(21) Appl. No.: 12/532,690

(22) PCT Filed: Feb. 22, 2008

(86) PCT No.: PCT/JP2008/053060
§ 371 (c)(1),
(2), (4) Date: Dec. 29, 2009

(87) PCT Pub. No.: WO2008/117602
PCT Pub. Date: Oct. 2, 2008

(65) Prior Publication Data
US 2010/0114420 A1    May 6, 2010

(30) Foreign Application Priority Data

Mar. 27, 2007 (JP) .................................. 2007-083063
Mar. 27, 2007 (JP) .................................. 2007-083064

(51) Int. Cl.
*B62H 1/10* (2006.01)
(52) U.S. Cl.
USPC .............. 701/124; 701/22; 180/218; 280/755
(58) Field of Classification Search .................. 180/209, 180/218, 21, 8.2, 7.1; 701/124, 116, 22, 701/1; 280/755; *B62K 17/00; B62H 1/10, B62H 1/12*
See application file for complete search history.

(56) References Cited

U.S. PATENT DOCUMENTS

| | | | | |
|---|---|---|---|---|
| 5,794,730 A * | 8/1998 | Kamen | ........................ | 180/7.1 |
| 5,975,225 A * | 11/1999 | Kamen et al. | .................. | 180/7.1 |
| 6,443,251 B1 * | 9/2002 | Morrell et al. | ................. | 180/8.2 |
| 6,561,294 B1 * | 5/2003 | Kamen et al. | ................... | 180/21 |
| 6,571,892 B2 * | 6/2003 | Kamen et al. | .................. | 180/8.2 |
| 7,004,271 B1 * | 2/2006 | Kamen et al. | .................. | 180/21 |
| 7,130,702 B2 * | 10/2006 | Morrell | .......................... | 700/75 |

(Continued)

FOREIGN PATENT DOCUMENTS

DE    3103961 A1    9/1982
DE    3800476 A1    7/1989
(Continued)

OTHER PUBLICATIONS

Supplementary European Search Report in corresponding European Application No. EP 08 71 1831 dated Mar. 8, 2012.

*Primary Examiner* — Joseph Rocca
*Assistant Examiner* — Keith Frisby
(74) *Attorney, Agent, or Firm* — Bacon & Thomas, PLLC

(57) ABSTRACT

A vehicle provides upstanding and tilted (standstill for allowing a user to get on an off the vehicle) positions without movement of the vehicle. In the vehicle, even if the vehicle body tilts, a riding section is moved in the forward-backward direction to bring the vehicle to an orientation where the center of gravity (P) of the vehicle body is on a vertical line (V) passing through ground contact points (S1) or drive wheels (12). This controls the tilt angle of the vehicle body and the position of the riding section (13) so that the center of gravity (P) does not move. Thus, the upright position and the tilted position of the vehicle are achieved without movement of the vehicle (without rotation of the wheels). Further, influences such as an error in parameters and disturbance are compensated for by a balancer that moves in the forward-backward direction.

8 Claims, 19 Drawing Sheets

RAISING CONTROL
(INGRESS ASSIST)

U.S. PATENT DOCUMENTS

| | | | |
|---|---|---|---|
| 7,182,166 B2 * | 2/2007 | Gray et al. | 180/209 |
| 7,407,187 B2 | 8/2008 | Kakinuma et al. | 280/755 |
| 8,016,060 B2 * | 9/2011 | Miki et al. | 180/65.1 |
| 2006/0103338 A1 | 5/2006 | Takeuchi | |
| 2008/0164083 A1 | 7/2008 | Miki et al. | 180/165 |

FOREIGN PATENT DOCUMENTS

| | | |
|---|---|---|
| GB | 2242173 A | 9/1991 |
| JP | 2004-074814 | 3/2004 |
| JP | 2004-276727 A | 10/2004 |
| JP | 2006-123854 A | 5/2006 |
| JP | 2007-223399 | 9/2007 |
| WO | WO 2006/095823 * | 9/2006 |
| WO | WO 2008/026511 | 3/2008 |

* cited by examiner

RAISING CONTROL
(INGRESS ASSIST)

INGRESS/EGRESS
STANDSTILL CONTROL
(EGRESS ASSIST)

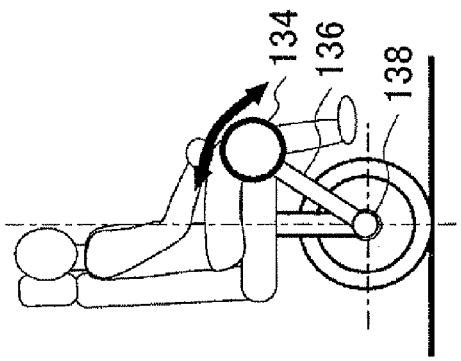
FIG. 10C ROTARY INVERTED PENDULUM TYPE
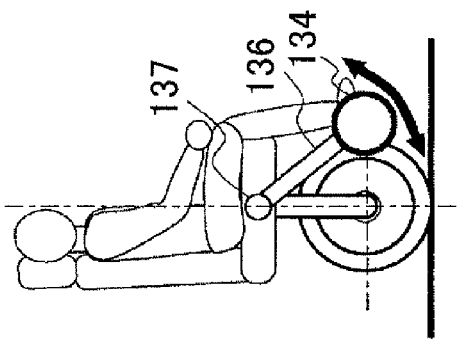
FIG. 10B ROTARY PENDULUM TYPE
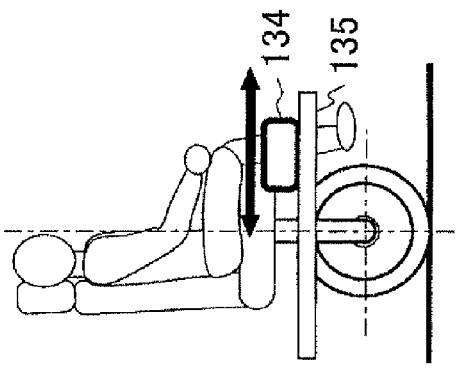
FIG. 10A LINEAR MOTION TYPE

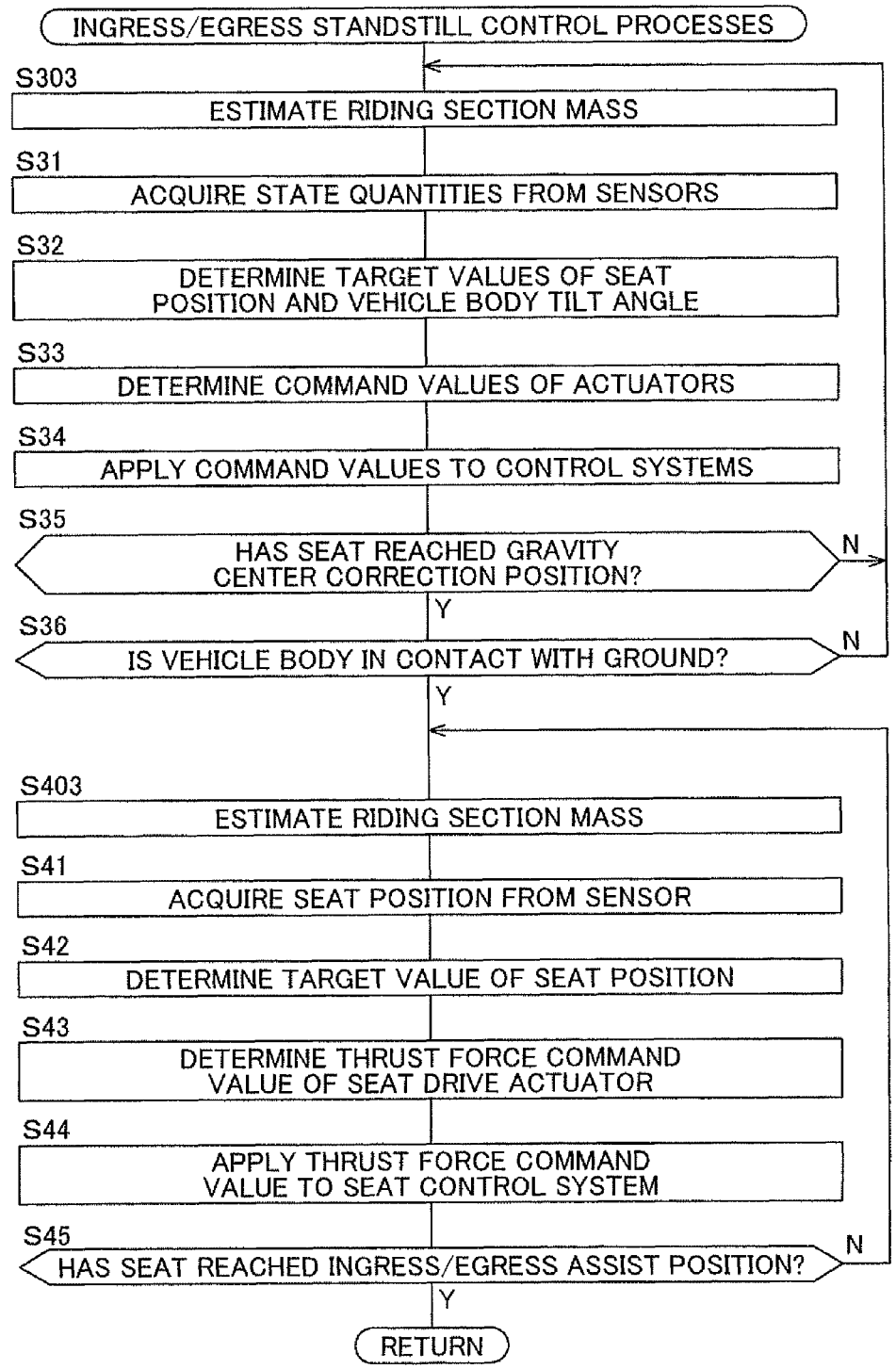

VEHICLE

TECHNICAL FIELD

The present invention relates to a vehicle, and for example, relates to a vehicle operating as an inverted pendulum for posture control.

BACKGROUND ART

Vehicles operating as an inverted pendulum for posture control (hereafter simply termed "inverted pendulum vehicles") have attracted attention. A sensor unit provided in an inverted pendulum vehicle detects the operating state and a transportation device is placed in a stationary or moving state by controlling the operation of a rotating body by a control unit. JP-A-2004-74814 and JP-A-2004-217170 disclose provision of a retractable auxiliary wheel in such an inverted pendulum vehicle.

JP-A-2004-74814 discusses facilitating the mounting and dismounting of the vehicle by a rider with ground contact of the extended auxiliary wheels to stabilize vehicle posture. Furthermore, extension of the auxiliary wheels maintains the vehicle posture when the posture control encounters difficult conditions. In JP-A-2004-217170 the auxiliary wheels are extended during abnormal operating conditions to maintain vehicle body stability.

DISCLOSURE OF THE INVENTION

None of the related art techniques described in the above-referenced Patent Documents are, however, designed to bring the vehicle to a standstill stably with the vehicle in a tilted position. Specifically, the related art techniques described in the cited documents make the auxiliary wheel contact the ground with the vehicle in a horizontal position, and are not concerned with control during ingress and egress, because the vehicle is in a horizontal position during ingress and egress. On the other hand, how to bring the vehicle to an upstanding position for starting after ingress and how to tilt the vehicle for stopping for egress are factors that affect ride comfort during ingress and egress, and must be provided for if the vehicle is to be brought to a standstill stably in a tilted position.

Accordingly, the applicant proposed in Japanese Patent Application No. 2007-22492 raising control for bringing an inverted pendulum vehicle that is at a standstill in a tilted position to an upstanding position and egress control for bringing the inverted pendulum vehicle to a standstill in a tilted position. Raising a vehicle body in a tilted standstill position or tilting a vehicle in an inverted position for stopping, however, allows reaction force of drive torque to rotate the wheel, moving the vehicle forward or backward. Specifically, control to achieve raising and tilting without involving movement of the vehicle was not provided.

It is therefore an object of the present invention to provide an inverted pendulum vehicle that can be raised, or tilted for a standstill for ingress and egress, without involving movement.

The present invention has a vehicle main body that includes a riding section and a vehicle body, and controls torque of a drive wheel according to the tilt of the vehicle body and rotation of the drive wheel. The vehicle includes: a limiting mechanism having a part that is in ground contact when the vehicle is at standstill to thereby limit the tilt angle of the vehicle main body; a riding section movement mechanism moving the riding section relative to the vehicle body; and raising control means for raising the vehicle main body, while moving the riding section with the riding section movement mechanism such that the center of gravity of the vehicle main body is positioned on a vertical line that passes through the ground contact point of the drive wheel.

Preferably, the raising control means starts raising the vehicle main body after the riding section is moved until the center of gravity of the vehicle main body is positioned on the vertical line that passes through the ground contact point of the drive wheel when the tilt angle of the vehicle body is limited by the limiting mechanism.

Preferably, the raising control means determines, with a change in the tilt angle of the vehicle main body, whether or not the riding section is moved until the center of gravity of the vehicle main body is positioned on the vertical line that passes through the ground contact point of the drive wheel.

Further, the raising control means may determine a riding section target position for the riding section and a vehicle body tilt angle target value for the vehicle body according to the time elapsed from the start of raising, and performs feedback control of movement of the riding section according to the riding section target position and feedback control of the tilt of the vehicle body according to the vehicle body tilt angle target value.

Preferably, the raising control means determines the riding section target position and the vehicle body tilt angle target value such that the raising speed at the start and completion of raising is lower than the raising speed between start and completion of the raising.

The vehicle of the present invention preferably further includes ingress/egress standstill control means for tilting the vehicle main body to an ingress/egress standstill position in which the part of the limiting mechanism is in ground contact, while moving the riding section using the riding section movement mechanism such that the center of gravity of the vehicle main body is positioned on a vertical line that passes through a ground contact point of the drive wheel.

Preferably, the ingress/egress standstill control means moves the riding section to tilt the vehicle main body after the ingress/egress standstill.

In one embodiment of the present invention, the ingress/egress standstill control means determines the ingress/egress standstill position when the vehicle body tilt angular velocity is equal to or less than a predetermined threshold value.

The present invention may further include load acquisition (determination) means for acquiring (determining) the load acting on the riding section. The riding section target position is determined according to the load acquired. The load acquisition means may acquire, as the load acting on the riding section, a value measured by a load meter mounted on the riding section or a value estimated by a state observer that uses at least one of the movement of the riding section, the tilt of the vehicle body, and the rotation of the drive wheel.

In another aspect, the present invention provides a vehicle that includes a riding section and a vehicle main body, and controls torque of a drive wheel according to tilt of the vehicle body and rotation of the drive wheel. The vehicle includes: a limiting mechanism having a part that is in ground contact when the vehicle is at standstill to thereby limit the tilt angle of the vehicle main body; a riding section movement mechanism moving the riding section relative to the vehicle body; a balancer which is movable relative to the vehicle body; raising control means for raising the vehicle main body, while moving the riding section with the riding section movement mechanism; and balancer control means for controlling movement of the balancer based on movement of the center of gravity of the vehicle main body that occurs as the vehicle main body is raised by the raising control means. In such embodiments, the raising control means starts raising the vehicle main body after moving the riding section until the center of gravity of the vehicle main body is positioned on a vertical line that passes through a ground contact point of the drive wheel when the tilt angle of the vehicle body is limited by the limiting mechanism; and the balancer control means starts controlling the movement of the balancer after the raising of the vehicle main body is started.

In another embodiment, the vehicle includes: a limiting mechanism having a part that is in ground contact to thereby limit the tilt angle of the vehicle main body; a riding section movement mechanism moving the riding section relative to the vehicle body; a balancer which is movable relative to the vehicle body; ingress/egress standstill control means for tilting the vehicle main body to an ingress/egress standstill position in which the part of the limiting mechanism is in ground contact, while moving the riding section using the riding section movement mechanism; and balancer control means for controlling movement of the balancer so as to compensate for movement of the center of gravity of the vehicle main body that occurs as the vehicle main body is tilted by the raising control means.

In another preferred embodiment the ingress/egress standstill control means determines the ingress/egress standstill position when the vehicle body tilt angular velocity is equal to or less than a predetermined threshold value.

The balancer control means includes feedback control of at least one of a wheel rotation angle, a vehicle body tilt angle, and the riding section position.

BRIEF DESCRIPTION OF THE DRAWINGS

FIGS. 10A to 10C show exemplary configurations of different balancer movement mechanisms.

FIG. 18 is a flowchart showing details of processes performed in ingress/egress standstill control according to the fourth embodiment of the present invention.

Figure 1A:
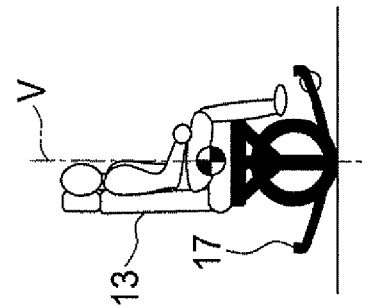
FIGS. 1A to 1F illustrate conditions of a vehicle in raising control and ingress/egress standstill control according to an embodiment of the present invention.

DESCRIPTION OF THE REFERENCE NUMERALS 11 drive wheel
12 drive motor
13 riding section
14 support member
131 seat cushion
132 seat back
133 head restraint
16 control unit
17 stopper
20 control ECU
21 main control ECU
22 drive wheel control ECU
23 balancer control ECU
24 seat control ECU
30 input device
31 steering device
32 start/egress switch
40 vehicle body control system
41 angle meter
50 drive wheel control system
51 drive wheel rotation angle meter
52 drive wheel actuator
60 balancer control system
61 balancer drive motor rotation angle meter
62 balancer drive actuator (motor)
70 seat control system
71 seat drive motor rotation angle meter
72 seat drive actuator
73 seat load meter
134 balancer
135 slider type actuator
136 support shaft
137, 138 balancer support shaft motor

DESCRIPTION OF PREFERRED EMBODIMENTS

A vehicle according to a preferred embodiment of the present invention will be described in detail below with reference to FIGS. 1 through 18.

(1) Outline of the Embodiment

In an inverted pendulum vehicle, it is very often easier for an occupant to get on or off the vehicle in a tilted position than in an upstanding position. In an inverted vehicle having a riding section at a relatively high level relative to the ground, for example, the vehicle should preferably be brought into a tilted position, because it is difficult for the occupant to get on the vehicle in an upstanding position. Additionally, tilting the vehicle will lower a gravity center thereof, which enhances vehicle stability during ingress and egress.

To achieve greater stability in the tilted position, the vehicle according to the embodiment includes a stopper (a limiting mechanism) as a structural body fixed to a vehicle body. The gravity center of a main body of the vehicle (that includes an occupant, the stopper, and the vehicle body, but excludes a drive wheel and a drive motor) is thereby moved to a position that is equidistant from a ground contact point of the drive wheel and a ground contact point of the stopper, so that the vehicle in a tilted position can be brought to a standstill stably.

In this specification, the condition, in which the stopper has its forward end in ground contact with the vehicle body in a tilted standstill position, is referred to as being an ingress/egress standstill.

In the ingress/egress standstill position, the gravity center of the vehicle main body exists forwardly of a vertical line extended from the ground contact point of the drive wheel. As a result, if torque for controlling to raise or tilt the vehicle is made to act on the vehicle body in order to raise or tilt the vehicle slowly, the wheel is rotated by resultant reaction force, thus moving the vehicle in a forward-backward direction.

In this embodiment, therefore, the riding section is moved in the forward-backward direction to thereby establish a condition, in which the gravity center of the vehicle main body lies on the vertical line extended from the ground contact point of the drive wheel. A vehicle body tilt angle and the position of the riding section are thus controlled such that the gravity center can be prevented from being moved. Raising and tilting can thus be achieved without involving vehicle movement (without rotating the wheel).

Figure 1B:
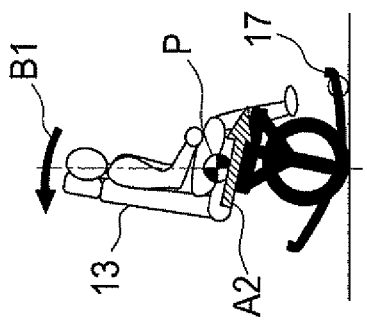
Figure 1C:
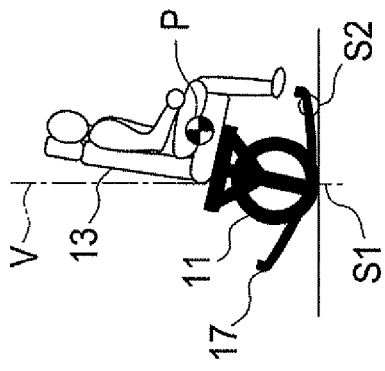
Figure 1D:
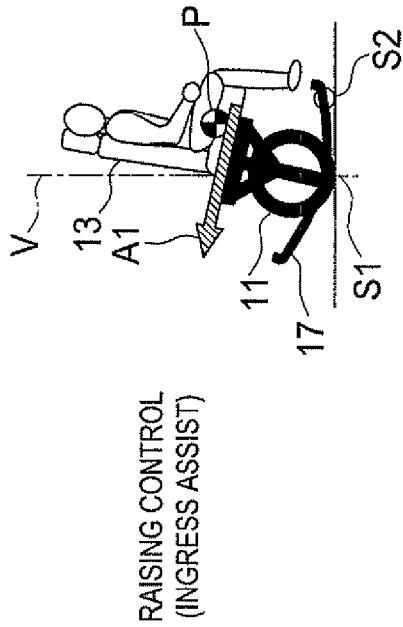
Figure 1E:
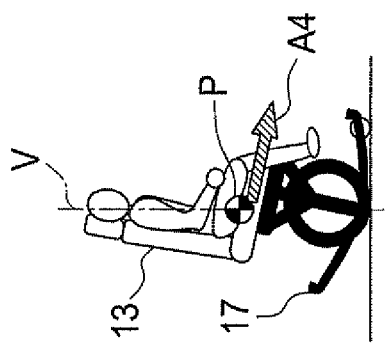
Figure 1F:
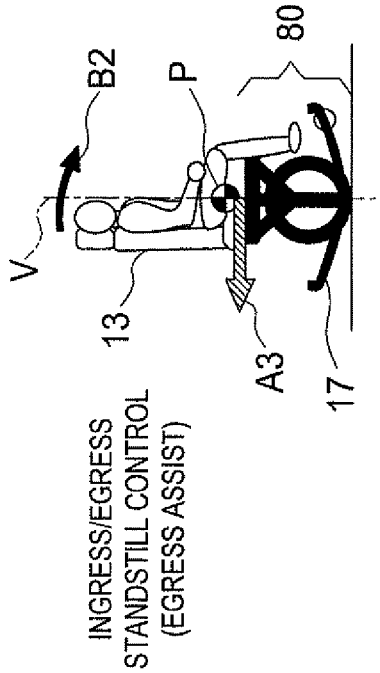

FIGS. 1A to 1F illustrate conditions of the vehicle in raising control (A through C) and ingress/egress standstill control (D through F) according to this embodiment. Referring to FIGS. 1A and 1F, in this embodiment, a riding section (seat) 13 is moved forwardly in the ingress/egress standstill position. In this condition, a gravity center P of the vehicle main body is disposed between a ground contact point S1 of a drive wheel 11 and a ground contact point S2 (leading end portion) of a stopper 17. Moving the riding section 13 forwardly on a low level in this manner facilitates ingress/egress.

When a raise command is issued after the occupant gets on board in this ingress/egress standstill position, the riding section 13 is moved backwardly, as shown by an arrow A1 in FIG. 1A, until the gravity center P is positioned on a vertical line V that passes through the ground contact point S1.

For a period of time during which the riding section 13 starts moving backwardly and the gravity center P is positioned on the vertical line V, both the ground contact point S1 and the ground contact point S2 are in ground contact and the gravity center P is disposed between the two ground contact points S1, S2, so that the tilt angle of the vehicle main body does not change.

Referring to FIG. 1B, when the gravity center P has moved to a point on the vertical line V, the vehicle main body 80 is brought to an upstanding position as shown by an arrow B1 by moving the riding section 13 forwardly as shown by an arrow A2 with care not to allow the gravity center P to be moved from the point on the vertical line V. FIG. 1C shows a condition in which raising control is completed. Note here that movement of the gravity center P is eliminated by moving the riding section 13 and the vehicle main body 80 such that an amount of movement of the gravity center as a result of the forward movement of the riding section 13 and an amount of movement of the gravity center as a result of the raising of the vehicle main body 80 are offset by each other.

For the ingress/egress standstill control, on the other hand, referring to FIG. 1D, the vehicle main body is tilted forwardly as shown by an arrow B2 by moving the riding section 13 backwardly as shown by an arrow A3 with care not to allow the gravity center P that lies on the point on the vertical line V to be moved away therefrom. When a leading end of the stopper 17 contacts the ground at the ground contact point S2, the vehicle leaves the inverted position to be brought to a standstill stably. To set the vehicle into an initial state of the ingress/egress standstill thereafter, the riding section 13 is moved forwardly to thereby lower a seat cushion for easier egress. FIG. 1F shows a condition, in which the ingress/egress standstill control is completed.

This embodiment achieves the following effects:

(a) In the ingress/egress standstill position, the forward end of the stopper is in ground contact and the gravity center of the vehicle main body lies between the drive wheel and the ground contact point of the stopper. The vehicle can therefore be brought to a standstill stably and the occupant can easily get on and off the vehicle.

(b) The vehicle can slowly achieve upstanding and tilted positions without involving vehicle movement, so that the occupant can be relieved of discomfort that is otherwise felt until the completion of raising or the ingress/egress standstill.

(c) The raising and ingress/egress standstill can be achieved without involving vehicle movement, which eliminates the need for acquiring a wide forward space upon ingress/egress.

(2) Details of the Embodiment

Figure 2:
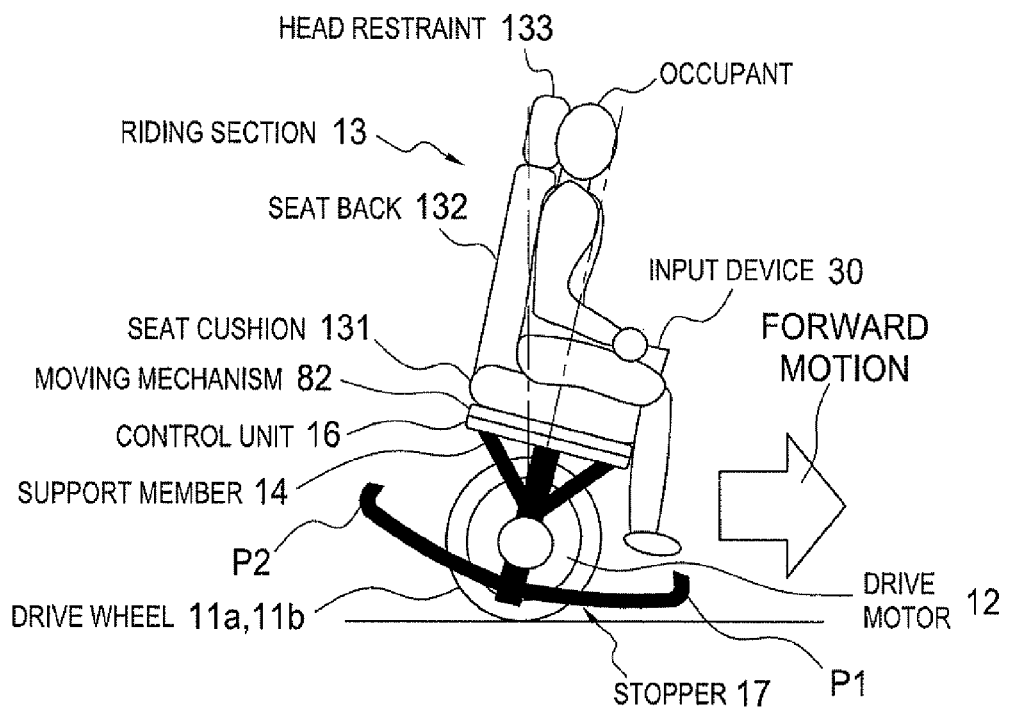
FIG. 2 is an exemplary diagram showing a condition of the vehicle according to the embodiment of the present invention, in which the vehicle runs in a forward direction.

FIG. 2 is an exemplary diagram showing a condition of the vehicle according to the embodiment of the present invention, in which the vehicle loaded with an occupant runs in a forward direction. Referring to FIG. 2, the vehicle includes two drive wheels 11a, 11b disposed coaxially. The drive wheels 11a, 11b are driven by drive motors 12a, 12b, respectively.

The riding section 13 (seat) loaded with a cargo, an occupant, or other weight body is disposed above the drive wheels 11a, 11b (referred to as a drive wheel 11 when both drive wheels 11a, 11b are being referred to) and a drive motor 12. The riding section 13 includes a seat cushion 131 on which a driver sits, a seat back 132, and a head restraint 133.

The riding section 13 is supported by a support member 14 via a movement mechanism 82 that functions as a riding section movement mechanism. The support member 14 is fixed to a drive motor cabinet in which the drive motor is accommodated. A linear guide system or other linear movement mechanism having low resistance may, for example, be used as the movement mechanism 82. The position of the riding section 13 relative to the support member 14 is to be changed through drive torque of a riding section drive motor. The "vehicle main body" is a combination of the support member 14, the drive wheels, 11a, 11b and the drive motor 12.

The linear guide system includes a guide rail fixed to the support member 14, a slider fixed to the riding section drive motor, and a rolling body. The guide rail includes two trackway grooves formed linearly longitudinally in right and left side surfaces of the guide rail. The slider includes a channel-shaped cross section extending widthways. Two trackway grooves are formed inside two mutually opposing side surfaces of the channel shape so as to oppose the two trackway grooves, respectively, in the guide rail. The rolling body is inserted between the trackway grooves, rolling in the trackway grooves as the guide rail and the slider make linear motions relative to each other. Additionally, the slider includes a return path formed therein for connecting both ends of the trackway grooves, so that the rolling body circulates through the trackway grooves and the return path.

The linear guide system includes a brake (clutch) that couples movement of the linear guide system. When no motion is required of the riding section, this brake comes into play to fix the slider onto the guide rail, so that the support member 14 to which the guide rail is fixed is held in position relative to the riding section 13 to which the slider is fixed. When motion is required, the brake is released, so that control can be performed to ensure that the distance between a reference position on the side of the support member 14 and a reference position on the side of the riding section 13 is a predetermined value.

An input device 30 is disposed beside the riding section 13. The input device 30 is operated by the rider for issuing a raise command or an ingress/egress standstill command according to the embodiment, in addition to issuing commands for acceleration, deceleration, turn, on-the-spot rotation, standstill, braking, and other operations of the vehicle.

The input device 30 according to the embodiment is fixed to the seat cushion 131. The input device 30 may instead be configured using a wired or wireless remote control, or disposed on an armrest provided additionally.

The vehicle according to the embodiment includes the input device 30 disposed therein. If the vehicle is to be run automatically according to predetermined travel command data, a travel command data acquisition section is disposed in place of the input device 30. The travel command data acquisition section may include, for example, data read means acquiring the travel command data from storage media of various sorts such as a semiconductor memory, and/or communications control means acquiring the travel command data externally through wireless communications.

FIGS. 1A to 1F show that a human sits aboard the riding section 13. The vehicle is not necessarily limited to an application of a human rider operating; rather, the vehicle may be loaded only with a cargo and run or stopped through, for example, remote control from an external environment or according to travel command data, or the vehicle may even be loaded with nothing and run or stopped. In this case, a raise command or an egress command is issued using, for example, a remote control as with the travel command data. In this embodiment, control of, for example, acceleration or deceleration is performed according to an operation signal inputted through the operation of the input device 30.

A control unit 16 is disposed between the riding section 13 and the drive wheel 11. In this embodiment, the control unit 16 is mounted on the support member 14. The control unit 16 may be mounted on a lower surface of the seat cushion 131 of the riding section 13. In this case, the control unit is moved in the forward-backward direction with the riding section 13 by the movement mechanism.

A pair of stoppers 17 is fixed to the support member 14. The pair of stoppers 17 functions as a limiting mechanism that limits the tilt angle of the vehicle body as part of the stoppers 17 contacts the ground in the ingress/egress standstill position. The pair of stoppers 17 is disposed between the drive wheels 11a and 11b.

The stopper 17 is shaped into a curve extending in the forward-backward direction of the vehicle from the position of the support member 14 to which the stopper 17 is fixed. Having a forward end P1 and a backward end P2 that contact the ground, the stopper 17 limits tilt of the vehicle body.

Having the forward end P1 and the backward end P2 equidistantly disposed from a rotary shaft of the drive wheel 11, the stopper 17 is positioned such that the forward end P1 is as high as the backward end P2 from the ground when the vehicle is in the upstanding position (with zero tilt angle of the vehicle body).

In accordance with the embodiment, the vehicle is in the ingress/egress standstill position with the forward end P1 in ground contact. At this time, the vehicle body tilt angle is set to 15 degrees. The tilt angle in the ingress/egress standstill position may be set to any angle as long as the tilt angle is greater than the vehicle body tilt angle during maximum acceleration of the vehicle.

In addition, the tilt angle when the backward end P2 is in ground contact may be set to any angle, as long as the tilt angle is greater than the vehicle body tilt angle during maximum deceleration of the vehicle. In this embodiment, this tilt angle is also set to 15 degrees. The two tilt angles may, however, be set to values different from each other in accordance with acceleration and deceleration requirements.

The distance between the rotary shaft of the drive wheel 11 and the forward end P1 of the stopper 17 is designed such that, with the forward end P1 in ground contact, both the vehicle gravity center with the occupant on board and the vehicle gravity center with an occupant having an assumed weight and build on board are located in a region from the ground contact point of the drive wheel 11 to the forward end P1 (vertically upward between the two points).

In this embodiment, portions that make up the vehicle, excluding the drive wheel 11 and the drive motor 12, are referred to as the vehicle main body. The vehicle main body includes, for example, the riding section 13, the stopper 17, a steering device 31 the control unit 16, and the movement mechanism. The vehicle main body is formed of the riding section 13 that is moved in the forward-backward direction of the vehicle by the movement mechanism, and the vehicle body including portions other than the riding section 13.

The vehicle according to the embodiment includes a battery among other miscellaneous types of devices. The battery supplies electric power for drive and arithmetic operations to, for example, the drive motor 12, the riding section drive motor, and a control electronic control unit (ECU) 20.

Figure 3:
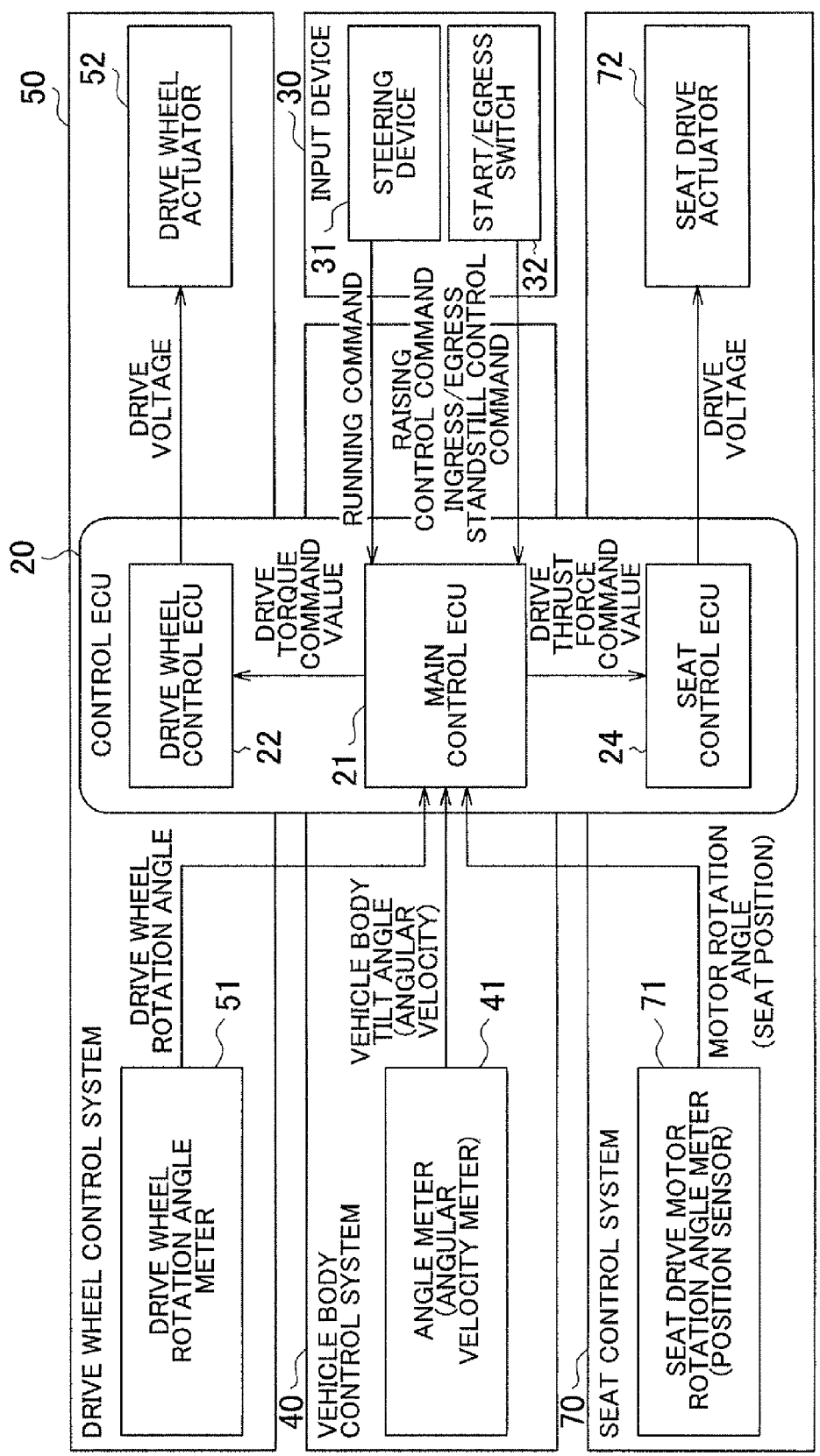
FIG. 3 is a block diagram of a control system according to a first embodiment and a fourth embodiment of the present invention.

FIG. 3 is a block diagram of a control system according to a first embodiment of the present invention.

The control system includes the control ECU 20 that functions as raising control means and ingress/egress standstill control means, the steering device 31, a start/egress switch 32, an angle meter (angular velocity meter) 41, a drive wheel rotation angle meter 51, a drive wheel actuator 52 (drive motor 12), a seat drive motor rotation angle meter (position sensor) 71, a seat drive actuator 72 (riding section drive motor), and other devices.

The control ECU 20 includes a main control ECU 21 and a drive wheel control ECU 22 ("means for controlling torque") and performs various types of controls including vehicle run and posture controls through, for example, drive wheel control and vehicle body control (inversion control). The control ECU 20 also includes a seat control ECU 24 ("raising control means") for performing the raising and ingress/egress standstill controls through movement of the riding section 13 in this embodiment. The control ECU 20 is formed of a computer system that includes a ROM that stores therein various programs and data, such as raising and ingress/egress standstill control programs in this embodiment, a RAM used as a work area, an external storage device, and an interface.

The main control ECU 21 is connected with the drive wheel rotation angle meter 51, the angle meter (angular velocity meter) 41, the seat drive motor rotation angle meter (position sensor) 71, and the steering device 31 and the start/egress switch 32 as the input device 30. The steering device 31 supplies the main control ECU 21 with a run command based on an operation performed by the occupant. The steering device 31 includes a joystick. With its upright position defined as a neutral position, the joystick is tilted in the forward-backward direction to indicate acceleration or deceleration and in the crosswise direction to indicate a turning curvature in the crosswise direction. The requested acceleration/deceleration or turning curvature is greater according to the tilt angle.

The start/egress switch 32 is used by the occupant to issue, for the vehicle, a start command and an egress command (command to set into the ingress/egress standstill position) after boarding. The start/egress switch 32 includes a start command switch and an egress command switch disposed thereon.

The main control ECU 21, together with the angle meter 41, functions as a vehicle body control system 40, performing, as posture control of the inverted pendulum vehicle, a posture control of the vehicle body using reaction torque of the drive wheel 11 based on the tilted position of the vehicle body.

The main control ECU 21, together with the drive wheel control ECU 22, the drive wheel rotation angle meter 51, and the drive wheel actuator 52, functions as a drive wheel control system 50. The drive wheel rotation angle meter 51 supplies the main control ECU 21 with the rotation angle of the drive wheel 11, the main control ECU 21 supplies the drive wheel control ECU 22 with a drive torque command value, and the drive wheel control ECU 22 supplies the drive wheel actuator 52 with a drive voltage corresponding to the drive torque command value. The drive wheel actuator 52 is adapted to control each of the drive wheels 11a, 11b independently of each other according to the command value.

The main control ECU 21, together with the seat control ECU 24, the seat drive motor rotation angle meter (position sensor) 71, and the seat drive actuator 72, functions as a seat control system 70. The seat drive motor rotation angle meter 71 supplies the main control ECU 21 with the rotation angle of a seat drive motor or the seat position, the main control ECU 21 supplies the seat control ECU 24 with a drive thrust force command value, and the seat control ECU 24 supplies the seat drive actuator 72 with a drive voltage corresponding to the drive thrust force command value. The seat drive actuator 72 is adapted to provide position control for the riding section 13 along the movement mechanism (linear guide system) according to the command value.

The main control ECU 21 functions as drive wheel torque determination means. The main control ECU 21 also functions as raising control means and ingress/egress standstill control means.

The raising and ingress/egress standstill control in the vehicle having the arrangements as described heretofore will be described below.

Figure 4:
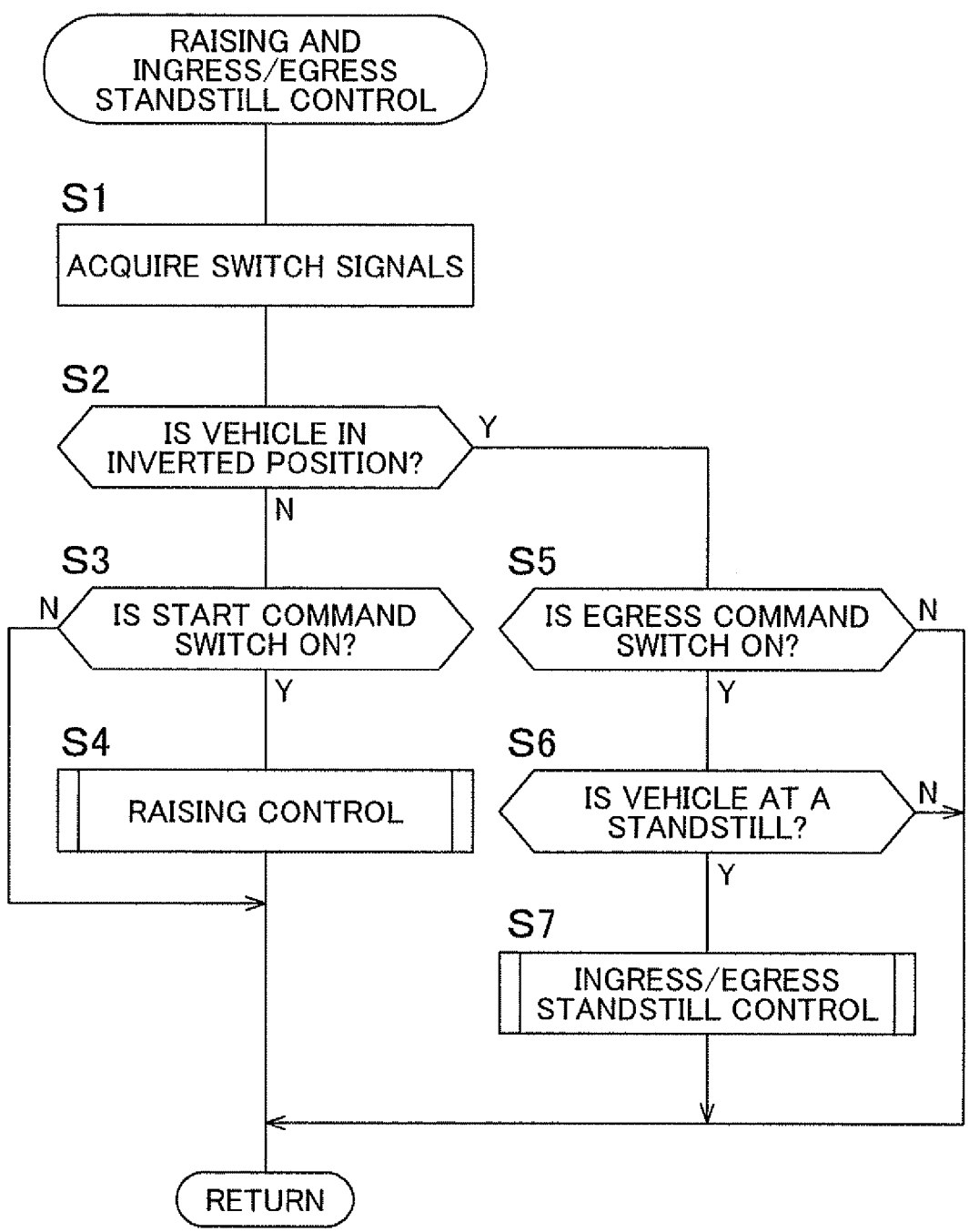
FIG. 4 is a flowchart showing a main flow of the raising and ingress/egress standstill control.

FIG. 4 is a flowchart showing a main flow of the raising and ingress/egress standstill control. The main flow of the raising and ingress/egress standstill control shown in FIG. 4 is common to the raising control and the ingress/egress standstill control in first to fourth embodiments to be described later.

First, the main control ECU 21 obtains start and egress command switch signals (step 1). Then main control ECU 21 then determines if the vehicle body is in an inverted position or not (step 2). This determination is made by, for example, using a measured value of the vehicle body tilt angle. If the vehicle body is not in the inverted position (step 2: N) and the start command switch is ON (step 3: Y), the main control ECU 21 executes a raising control process (step 4) to be described later and thereafter returns to a main routine. Ordinary posture (inverted) control and running control are executed in the main routine following the raising control process.

If the vehicle body is in the inverted position (step 2: Y) and the egress command switch is ON (step 5: Y), the main control ECU 21 determines if the vehicle is at a standstill in the inverted position (step 6). In determining that the vehicle is at a standstill in the inverted position, the main control ECU 21 uses the speed (absolute value) of each drive wheel 11; if the speed of both is equal to, or less than, a predetermined threshold value, the main control ECU 21 then determines a "standstill". If the vehicle is yet to be at a standstill in the inverted position, as, for example, during deceleration for a standstill (step 6: N), the main control ECU 21 returns to the main routine and continues performing inverted posture control until a decision of "standstill" is reached (step 6: Y).

Determining that the vehicle is at a standstill in the inverted position (step 6: Y), the main control ECU 21 executes the ingress/egress standstill control to be described later (step 7) before returning to the main routine. In the main routine following the ingress/egress standstill control, in which the vehicle is at a standstill, control is passed onto processes corresponding to, for example, monitoring of a subsequent raising control command or the event of an ignition key being turned OFF (power OFF command).

In accordance with this embodiment, the raising control is performed when the vehicle body is not in the inverted position and the start command switch is ON. Alternatively, a load sensor as an example may be disposed on the seat cushion 131 of the riding section 13, so that the raising control can be started on conditions of supply of a raising control command and detection of the occupant seating. For example, the raising control is not started if the seating is not detected even with a raise command. The raising control may still be started on conditions of the detection of seating only, even if the occupant does not operate the start command switch.

The ingress/egress standstill control is performed when the egress command switch is turned ON with the vehicle body in an inverted standstill position. Control may nonetheless be forced into the ingress/egress standstill control, if the main control ECU 21 detects an abnormal condition of some sort and determines that it is difficult to continue performing the vehicle posture control.

Figure 5:
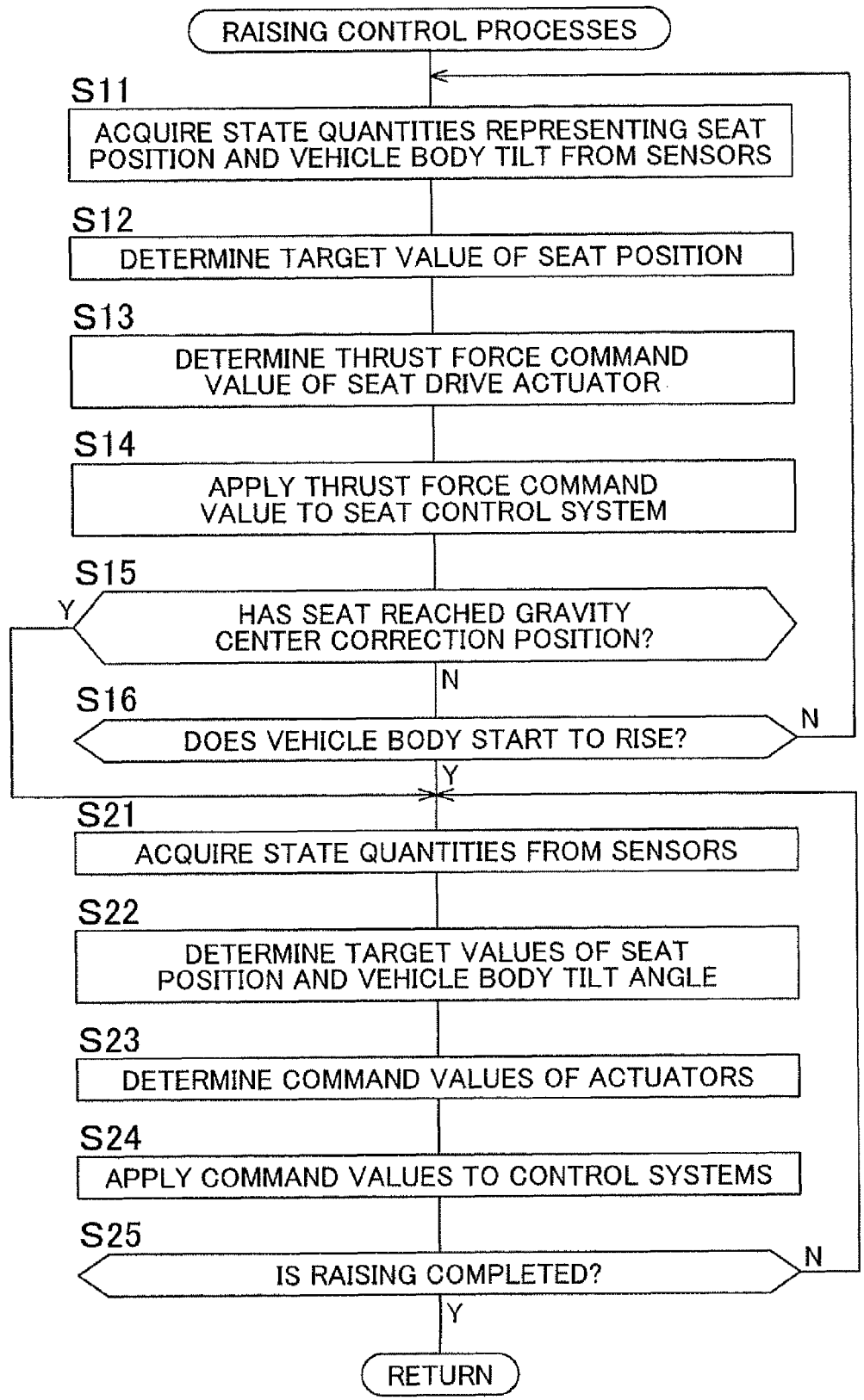
FIG. 5 is a flowchart showing details of processes performed in the raising control according to the first embodiment of the present invention.

Details of the raising control in the first embodiment (step 4 of FIG. 4) will be described below. FIG. 5 is a flowchart showing details of processes performed in the raising control according to the first embodiment. Note that, in the description that follows, the riding section 13 is referred to as the seat.

The main control ECU 21 acquires state quantities representing the vehicle body tilt and wheel rotation from sensors (step 11). Specifically, the main control ECU 21 acquires a rotation angle (seat position $\lambda_S$) from the seat drive motor rotation angle meter (position sensor) 71 and a vehicle body tilt angle $\theta_1$ (angular velocity) from the angle meter (angular velocity meter) 41.

Additionally, the main control ECU 21 determines a seat position target value $\lambda_S^*$ based on the state quantities acquired in step 11 (step 12). Specifically, the main control ECU 21 determines the seat position target value $\lambda_S^*$ using expressions 1 and 2 given below.

When $r<1, \lambda_S^* = \lambda_{S,init}(1-r) + \lambda_{S,n}r$;

When $r \geq 1, \lambda_S^* = \lambda_{S,n}$     (Expression 1)

In expression 1, r represents a period of time t from the start of the control nondimensionalized by a predetermined period of time $T_1$ (r=t/$T_1$). Further, $\lambda_{S,init}$ represents the seat position (initial position of the seat) at the start of this control. $\lambda_{S,n}$ represents a gravity center correction position of the seat expressed by expression 2 to be described later. The gravity center correction position is the position of the seat (riding section 13) in a condition, in which the gravity center P of the vehicle main body including the occupant and the seat lies on the vertical line V that passes through the ground contact point S1 of the drive wheel 11 (see FIG. 1B).

$T_1$ represents a period of time through which the seat moves backwardly, or a seat backward movement time, for which a predetermined value is used.

Figure 6A:
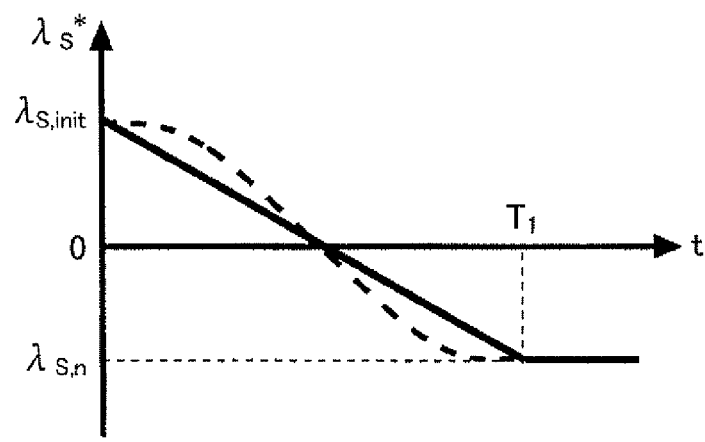
FIGS. 6A to 6C are diagrams illustrating changes with time in a seat position target value $\lambda_S^*$ and a vehicle body tilt angle target value $\theta_1^*$ in the raising control.

In this embodiment, the seat position target value $\lambda_S^*$ is determined such that the seat initial position $\lambda_{S,init}$ changes linearly to the gravity center correction position $\lambda_{S,n}$ for the seat backward movement time $T_1$, as shown in FIG. 6A.

Referring to a dotted line shown in FIG. 6A, the seat position target value $\lambda_S^*$ may, however, be set such that a rate of change in position at the start of movement from the seat initial position $\lambda_{S,init}$ and before the completion of movement to the gravity center correction position $\lambda_{S,n}$ is smaller than a rate of change in position between the two. This lessens impact on the occupant resulting from acceleration/deceleration of seat movement.

The gravity center correction position $\lambda_{S,n}$ of the seat is set by expression 2 given below. In expression 2, $\theta_{1,init}$ represents an initial tilt angle of the vehicle body (a value at the start of this control). Further, $l_1$ represents a gravity center distance of the vehicle main body from an axle, $m_s$ riding section mass, and $m_1$ mass of the vehicle main body (including the riding section).

$$\lambda_{S,n} = -l_1(m_1/m_s)\tan\theta_{1,init} \quad \text{(Expression 2)}$$

The main control ECU 21 next determines a drive thrust force command value $S_S$ of the seat for the seat drive actuator 72 (step 13). Specifically, the main control ECU 21 determines the drive thrust force command value $S_S$ of the seat using the previously determined seat position target value $\lambda_S^*$ and expression 3 given below. Where, {x} represents a derivative of x with respect to time; for example, {$\lambda_S$} is a derivative of $\lambda_S$ with respect to time. The same notation is used also in the following description.

$$S_S = S_{S,f} - K_{S7}(\lambda_S - \lambda_S^*) - K_{S8}(\{\lambda_S\} - \{\lambda_S^*\}) \quad \text{(Expression 3)}$$

In expression 3, $\lambda_S$ is the current seat position detected by the seat drive motor rotation angle meter 71. Feedback control is provided so that the value of $\lambda_S$ coincides with the seat position target value $\lambda_S^*$ determined in step 11.

$K_{S7}$ and $K_{S8}$ are a feedback gain, for which a value previously determined by, for example, a pole assignment method is used.

$S_{S,f}$ represents a feedforward torque for dry friction resistance, for which a set value is assigned with its positive or negative sign being varied according the movement direction (a negative value for backward movement). An integral gain of a seat position deviation ($\lambda_S - \lambda_S^*$) may be given instead of $S_{S,f}$.

This embodiment uses expression 3; however, the first and third terms, which enhance accuracy, may be omitted. For example, $S_S = -K_{S7}(\lambda_S - \lambda_S^*)$ may be used.

The main control ECU 21 then gives the seat control system 70 the drive thrust force command value $S_S$ determined earlier (step 14). Specifically, the main control ECU 21 supplies the seat control ECU 24 with the drive thrust force command value $S_S$ of the seat previously determined and the seat control ECU 24 supplies the seat drive actuator 72 with a drive voltage corresponding to the drive thrust force command value $S_S$. This causes the seat (riding section 13) to move backwardly toward the seat position target value $\lambda_S^*$.

The main control ECU 21 then determines if the moved seat reaches the gravity center correction position (step 15). Again, the gravity center correction position is the position of the seat when the gravity center P of the vehicle main body lies on the vertical line that passes through the ground contact point S1 of the drive wheel 11 as shown in FIG. 1B. Determining that the seat has reached the gravity center correction position (step 15: Y), the main control ECU 21 proceeds to processes of steps 21 and onward to start the raising of the vehicle body.

If, on the other hand, determining that the seat is yet to reach the gravity center correction position (step 15: N), the main control ECU 21 then determines if the vehicle main body starts to rise (step 16). A decision of "rise" is made if, for example, the quantity of the vehicle body tilt angle varied from its initial value is equal to, or more than, a predetermined threshold value. As described above, it is determined whether or not the vehicle main body starts to rise before the seat reaches the gravity center correction position $\lambda_{S,n}$ of the seat as set according to expression 2 (step 15: N). This is because the vehicle body may start rising because of parameter errors and disturbances involved with respect to the gravity center correction position $\lambda_{S,n}$ as a calculated value obtained using expression 2. Examples of cases where the vehicle main body starts rising include: the gravity center of the vehicle main body deviating from an anticipated position due to the actual occupant weight greatly different from an anticipated value; and the vehicle receiving disturbances such as wind.

If detecting a rise of the vehicle main body (step 16: Y) as described above, the main control ECU 21 considers that the gravity center P of the actual vehicle main body has reached a point on the vertical line V that passes through the ground contact point S1 of the drive wheel 11 (see FIG. 1B). The main control ECU 21 then immediately stops the backward movement of the seat, proceeding to processes of raising the vehicle body in steps 21 and onward.

If the seat is yet to reach the gravity center correction position $\lambda_{S,n}$ (step 15: N) and the vehicle body is yet to start rising (step 16: N), the main control ECU 21 returns to step 11 and repeats moving the seat to the gravity center correction position. Processes of from steps 11 to 16 are concerned with issuing the raising control command in the ingress/egress standstill position (FIG. 1A), moving the seat (riding section 13) backwardly, and the gravity center P of the vehicle main body reaching a point on the vertical line V that passes through the ground contact point S1 of the drive wheel 11 (FIG. 1B).

After the gravity center P of the vehicle main body has reached a point on the vertical line V that passes through the ground contact point S1 of the drive wheel 11 (step 15: Y, step 16: Y), the main control ECU 21 raises the vehicle main body through steps from 21 to 25. Processes of from steps 21 to 25 are to complete the raising of the vehicle body (FIG. 1C) after the gravity center P of the vehicle main body has moved to the gravity center correction position (a point on the vertical line V) (FIG. 1B). The processes of these steps are controlled so that the gravity center P of the vehicle main body and the position of the vehicle are not moved.

First, the main control ECU 21 acquires state quantities from sensors (step 21). Specifically, the main control ECU 21 acquires a rotation angle (seat position $\lambda_S$) from the seat drive motor rotation angle meter (position sensor) 71, a vehicle body tilt angle $\theta_1$ (angular velocity) from the angle meter (angular velocity meter) 41, and a drive wheel rotation angle $\theta_W$ from the drive wheel rotation angle meter 51, respectively.

The main control ECU 21 then determines target values $\lambda_S^*$ and $\theta_1^*$ of the seat position and vehicle body tilt angle, respectively (step 22). Specifically, the main control ECU 21 determines the target value $\lambda_S^*$ of the seat position using expression 4 and the target value $\theta_1^*$ of the vehicle body tilt angle using the target value $\lambda_S^*$ and expression 5, When $r<1, \lambda_S^* = \lambda_{S,init2}(1-r)$;

When $r \geq 1, \lambda_S^* = 0 (r \geq 1)$     (Expression 4)

$\theta_1^* = -\tan^{-1}(m_S \lambda_S^*/m_1 l_1)$     (Expression 5)

In expression 4, r represents a period of time t from the start of this control loop (steps 21 to 25) nondimensionalized by a predetermined period of time $T_2$ ($r=t/T_2$). Further, $\lambda_{S,init2}$ represents the seat position (initial position of the seat) at the start of this control loop.

$\lambda_{S,n}$ represents the gravity center correction position of the seat described earlier.

$T_2$ represents a seat forward movement time, for which a predetermined value is used.

Figure 6B:
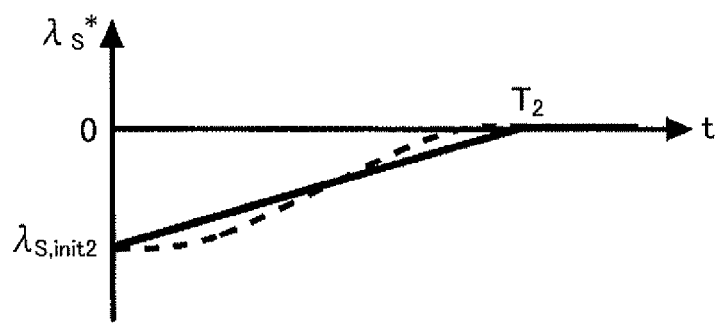

In this embodiment, the seat position target value $\lambda_S^*$ is determined such that, for the seat forward movement time $T_2$, the seat initial position $\lambda_{S,init2}$ changes linearly to a seat reference position of $\lambda_S^*=0$ (position of the seat at which the gravity center P of the vehicle main body lies on a point on the vertical line that passes through the ground contact point S1 of the drive wheel 11 with the vehicle in an inverted position) as shown in FIG. 6B. Additionally, the vehicle body tilt angle target value $\theta_1^*$ is determined such that the vehicle body tilt angle target value $\theta_1^*$ changes, for the seat forward movement time $T_2$, to an upstanding position of $\theta_1^*=0$ along a curve expressed by expression 5, as shown in FIG. 6C.

Figure 6C:
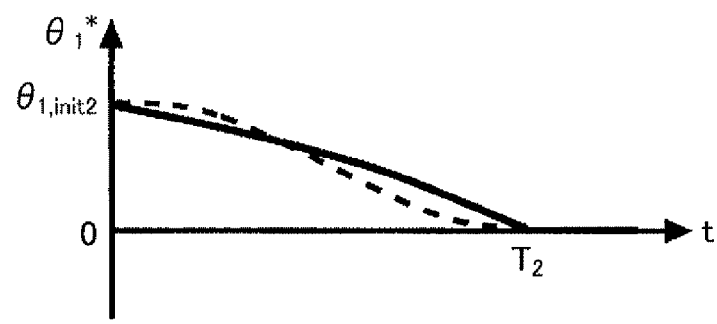

Referring to a dotted line shown in FIGS. 6B and 6C, the seat position target value $\lambda_S^*$ and the vehicle body tilt angle target value $\theta_1^*$ may, however, be set such that a rate of change in position at the start of movement from the seat initial position and before the completion of movement is smaller than a rate of change in position between the two. This lessens impact on the occupant resulting from acceleration/deceleration of seat movement and vehicle body raising.

The main control ECU 21 then determines command values $S_S$, $\tau_W$ of the actuators (step 23). Specifically, the main control ECU 21 determines, from the target values $\lambda_S^*$ and $\theta_1^*$ of the seat position and vehicle body tilt angle determined earlier, the drive thrust force command value $S_S$ of the seat using expression 6 and the torque command value $\tau_W$ of the drive wheel using expression 7, respectively.

$S_S = S_{S,f} - K_{S7}(\lambda_S - \lambda_S^*) - K_{S8}(\{\lambda_S\} - \{\lambda_S^*\})$     (Expression 6)

$\tau_W = -K_{W2}\{\theta_W\} + K_{W3}(\theta_1 - \theta_1^*) + K_{W4}(\{\theta_1\} - \{\theta_1^*\})$     (Expression 7)

In expression 7, $K_{W2}$, $K_{W3}$, $K_{W4}$, $K_{S7}$, and $K_{S8}$ are a feedback gain, for which a value previously determined by, for example, a pole assignment method is used. Note that, in feedback control according to expression 7, the position and speed of the seat may be taken into consideration. Further, in expression 6, an integral gain may be given instead of the feedforward torque $S_{S,f}$ for dry friction resistance.

The main control ECU 21 then gives corresponding control systems the command values $S_S$, $\tau_W$ (step 24). Specifically, the main control ECU 21 supplies the seat control ECU 24 and the drive wheel control ECU 22 with the command values $S_S$, $\tau_W$ determined earlier, respectively. The drive wheel control ECU 22 then supplies the drive wheel actuator 52 with a drive voltage corresponding to the command value $\tau_W$, thereby giving the drive wheel 11 a drive torque $\tau_W$. Similarly, the seat control ECU 24 supplies the seat drive actuator 72 with a drive voltage corresponding to the command value $S_S$, which moves the seat (riding section 13) forward. The drive torque $\tau_W$ from the drive wheel 11 causes the vehicle main body to rise, while gradually decreasing the tilt angle $\theta$. The amount of movement of the gravity center as a result of the rise is offset by the forward movement of the seat. The raising operation is therefore performed without allowing the vehicle to move in the forward-backward direction.

The main control ECU 21 then determines whether the upstanding position is achieved with the raising completed (step 25). The main control ECU 21 determines an "inversion (=completion of raising)" when, for example, the vehicle body tilt angle (absolute value) is equal to, or less than, a predetermined threshold value. If the vehicle main body is not in the inverted position (step 25: N), the main control ECU 21 returns to step 21 to continue performing the raising control. If the upstanding position is reached (step 25: Y), on the other hand, the main control ECU 21 terminates the raising control processes according to the embodiment. The main control ECU 21 then executes the posture (inversion) control and run control of the vehicle in the inverted position.

Figure 7:
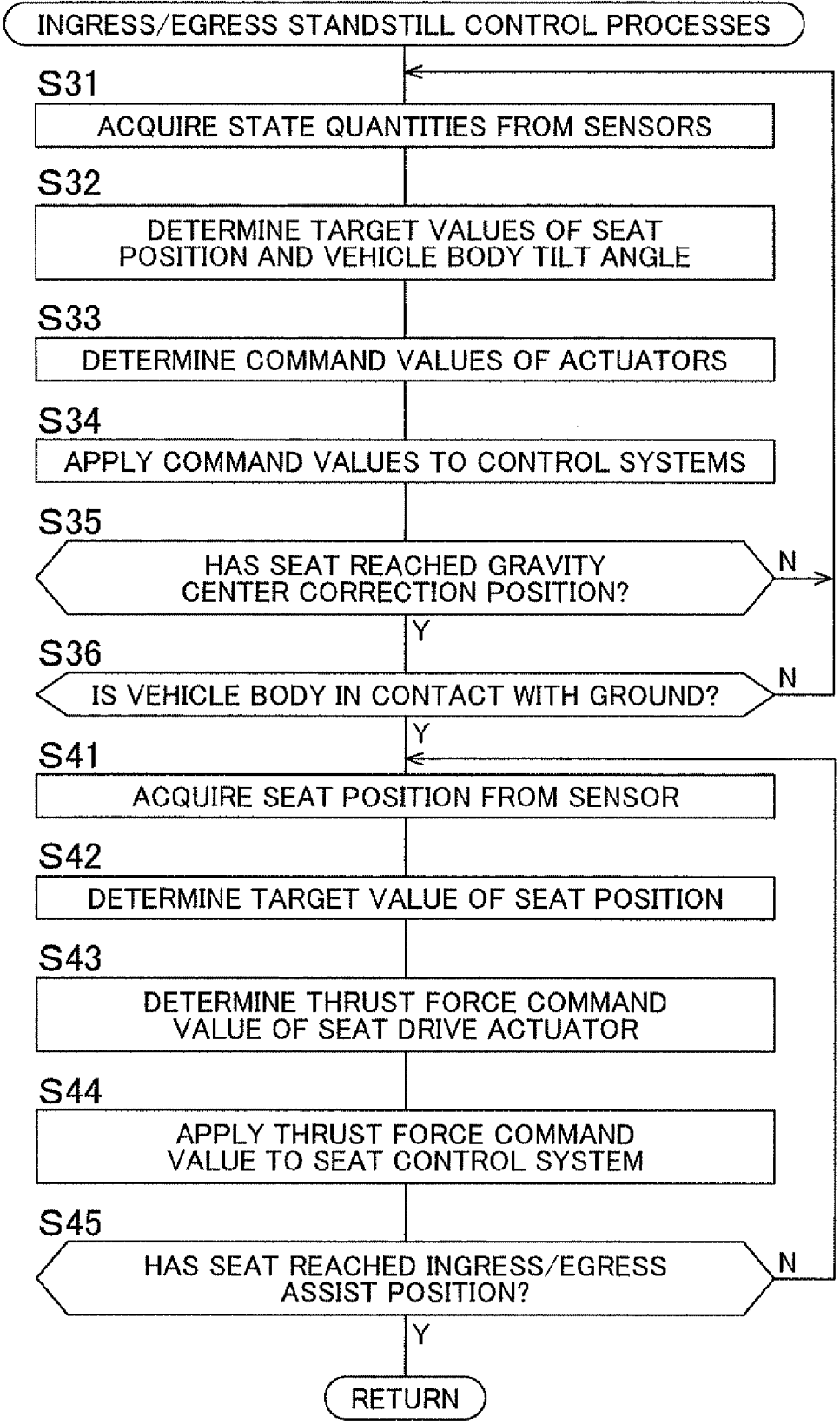
FIG. 7 is a flowchart showing details of processes performed in the ingress/egress standstill control according to the first embodiment of the present invention.

Details of the ingress/egress standstill control in the first embodiment (step 7 of FIG. 4) will be described below. FIG. 7 is a flowchart showing details of processes performed in the ingress/egress standstill control according to the first embodiment of the present invention.

In the ingress/egress standstill control shown in FIG. 7, processes of from steps 31 through 36 are concerned with operations for grounding the forward end P1 of the stopper without allowing the gravity center P of the vehicle main body to move or the vehicle to move in the forward-backward direction; specifically, the processes are concerned with operations from the inverted position (FIG. 1D) to the ingress/egress standstill position (FIG. 1F).

Processes of from steps 41 through 45 are concerned with operations for moving the seat to the forward-most position (ingress/egress assist position) for assisting the occupant in getting off the vehicle in the ingress/egress standstill position.

The main control ECU 21 acquires state quantities from sensors (step 31). Specifically, the main control ECU 21 acquires a rotation angle (seat position $\lambda_S$) from the seat drive motor rotation angle meter (position sensor) 71, a vehicle body tilt angle $\theta_1$ (angular velocity) from the angle meter (angular velocity meter) 41, and a drive wheel rotation angle $\theta_W$ from the drive wheel rotation angle meter 51, respectively.

The main control ECU 21 then determines the target value $\lambda_S^*$ of the seat position and the target value $\theta_1^*$ of the vehicle body tilt angle (step 32). Specifically, the main control ECU 21 determines the target value $\lambda_S^*$ of the seat position using expressions 8 and 9 given in the following. Similarly, the main control ECU 21 determines the target value $\theta_1^*$ of the vehicle body tilt angle using the target value $\lambda_S^*$ of the seat position determined earlier and expression 10.

$\lambda_S^* = \lambda_{S,n} r$     (Expression 8)

$\lambda_{S,n} = -l_1(m_1/m_S)\tan \theta_{1,F}$     (Expression 9)

$\theta_1^* = -\tan^{-1}(m_S\{\lambda_S^*\}/m_1 l_1)$     (Expression 10)

In expression 8, r represents a period of time t from the start of this control loop (steps 31 to 36) nondimensionalized by a predetermined period of time $T_2$ ($r=t/T_2$). $T_2$ represents a seat backward movement time, for which a predetermined value is used. $\lambda_{S,n}$ represents the gravity center correction position of the seat and is calculated using expression 9. The gravity center correction position is the position of the seat (riding section 13) in a condition, in which the gravity center P of the vehicle main body lies on a point on the vertical line V that passes through the ground contact point S1 of the drive wheel 11 with the vehicle body in ground contact (in the ingress/egress standstill position).

In expression 9, $\theta_{1,F}$ represents the tilt angle of the vehicle main body in a condition, in which the forward end P1 of the stopper is in ground contact, specifically, in the ingress/egress standstill position (vehicle body grounding tilt angle), for which a predetermined value is used. Note, however, that, during the raising control shown in FIG. 5, a value immediately before the vehicle body is brought into an upstanding position (value in the ingress/egress standstill position) may be stored in memory for later use, instead of the predetermined value.

Figure 8A:
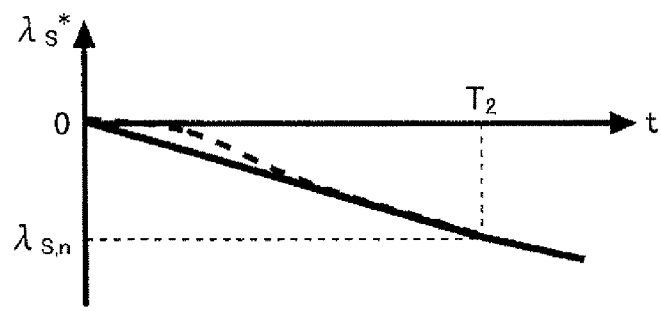
FIGS. 8A to 8C are diagrams illustrating changes with time in the seat position target value $\lambda_S^*$ and the vehicle body tilt angle target value $\theta_1^*$ in the ingress/egress standstill control.
Figure 8B:
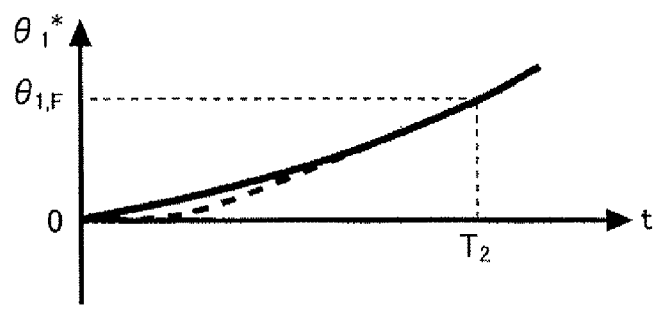

Expressions 8 and 9 are used to set the target value $\lambda_S^*$ of the seat position and the target value $\theta_1^*$ of the vehicle body tilt angle relative to the seat backward movement time $T_2$, as shown by solid lines in FIGS. 8A and 8B; however, impact on the occupant resulting from acceleration/deceleration of seat movement and vehicle body tilting may be lessened by setting operations as indicated by dotted lines.

The main control ECU 21 then determines command values $S_S$, $\tau_W$ of the actuators (step 33). Specifically, the main control ECU 21 determines, from the target values $\lambda_S^*$ and $\theta_1^*$ of the seat position and vehicle body tilt angle determined using expressions 8 to 10, the drive thrust force command value $S_S$ of the seat using expression 11 and the torque command value $\tau_W$ of the drive wheel 11 using expression 12, respectively.

$$S_S = S_{S,f} - K_{S7}(\lambda_S - \lambda_S^*) - K_{S8}(\{\lambda_S\} - \{\lambda_S^*\}) \quad \text{(Expression 11)}$$

$$\tau_W = -K_{W2}\{\theta_W\} + K_{W3}(\theta_1 - \theta_1^*) + K_{W4}(\{\theta_1\} - \{\theta_1^*\}) \quad \text{(Expression 12)}$$

In expression 12, $K_{W2}$, $K_{W3}$, $K_{W4}$, $K_{S7}$, and $K_{S8}$ are a feedback gain, for which a value previously determined by, for example, a pole assignment method is used. Note that, in feedback control according to expression 12, the position and speed of the seat may be taken into consideration. Further, in expression 11, an integral gain may be given instead of the feedforward torque $S_{S,f}$ for dry friction resistance.

The main control ECU 21 then gives corresponding control systems the command values $S_S$, $\tau_W$ (step 34). Specifically, the main control ECU 21 supplies the seat control ECU 24 and the drive wheel control ECU 22 with the command values $S_S$, $\tau_W$ determined earlier, respectively.

The drive wheel control ECU 22 then supplies the drive wheel actuator 52 with a drive voltage corresponding to the command value $\tau_W$, thereby giving the drive wheel 11 a drive torque $\tau_W$. Similarly, the seat control ECU 24 supplies the seat drive actuator 72 with a drive voltage corresponding to the command value $S_S$, which moves the seat (riding section 13) backward.

The drive torque $\tau_W$ from the drive wheel 11 causes the vehicle main body to tilt, while gradually increasing the tilt angle $\theta$. The amount of movement of the gravity center as a result of the tilt is offset by the backward movement of the seat. The forward tilt operation is therefore performed without allowing the vehicle to move in the forward-backward direction.

The main control ECU 21 then determines if the seat has reached the gravity center correction position, specifically, the position of the seat in the condition, in which the gravity center P of the vehicle main body lies on a point on the vertical line V that passes through the ground contact point S1 of the drive wheel 11 with the vehicle body in ground contact (in the ingress/egress standstill position) (step 35).

If the seat is yet to reach the gravity center correction position (step 15: N), the main control ECU 21 returns to step 31 and continues to perform operations of backward movement of the seat and forward tilt of the vehicle main body.

If the seat has reached the gravity center correction position (step 35: Y), the main control ECU 21 further determines whether the vehicle main body is actually in ground contact, specifically, if the forward end P1 of the stopper 17 is in ground contact (step 36). The main control ECU 21 determines "grounding (=completion of tilting)" if, for example, the vehicle body tilt angle is equal to, or more than, a predetermined threshold value.

If the vehicle main body is not in ground contact (step 36: N), it is estimated that, in reality, the gravity center P of the vehicle main body has not yet reached the gravity center correction position due to parameter errors or disturbance as during raising control, though the seat has moved to a theoretical gravity center correction position. The main control ECU 21 therefore returns to step 31 and continues to perform operations of backward movement of the seat and forward tilt of the vehicle main body.

On completing the processes of achieving the ingress/egress standstill position from the inverted position through the loop of from steps 31 through 36 described above, the main control ECU 21 performs processes of egress assist through a loop of from steps 41 through 45.

First, the main control ECU 21 acquires the current seat position (rotation angle) $\lambda_S$ from the seat drive motor rotation angle meter (position sensor) 71 (step 41).

Then, the main control ECU 21 determines the target value $\lambda_S^*$ of the seat position using expression 13 given below (step 42).

$$\text{When } r < 1, \lambda_S^* = \lambda_{S,init1}(1-r) + \lambda_{S,end} r;$$

$$\text{When } r \geq 1, \lambda_S^* = \lambda_{S,end} \quad \text{(Expression 13)}$$

In expression 13, r represents a period of time t from the start of movement of the seat nondimensionalized by a predetermined period of time $T_1$ ($r = t/T_1$).

Further, $\lambda_{S,init1}$ represents the seat position (initial position of the seat) at the start of the seat movement.

$\lambda_{S,end}$ represents an ingress/egress assist position of the seat calculated by expression 14 to be described later. The ingress/egress assist position is a position of the seat set at which the occupant gets on and off the vehicle. In accordance with this embodiment, the ingress/egress assist position is set such that the gravity center P of the vehicle main body is located equidistantly from the ground contact point S1 of the drive wheel and the ground contact point S2 of the stopper (see FIGS. 1A to 1F).

The ingress/egress assist position according to the embodiment is set as described above with vehicle body stability during ingress/egress of the occupant given top priority. The ingress/egress assist position (seat position) may nonetheless be moved further forwardly (on the side of the ground contact point S2 of the stopper) to place a particular emphasis on ease of ingress/egress on the part of the occupant. To shorten time from ingress to raising, or from tilting to egress, the ingress/egress assist position may even be set further backwardly (on the side of the ground contact point S1 of the drive wheel), thereby reducing the amount of movement of the seat.

$T_1$ represents a seat forward movement time, for which a predetermined value is used.

Figure 8C:
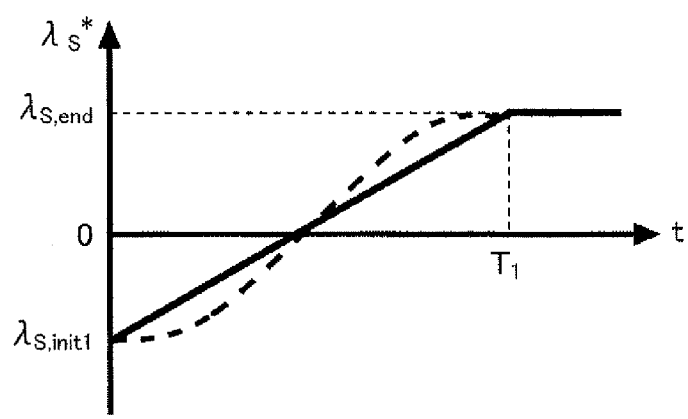

In this embodiment, the seat position target value $\lambda_S^*$ is determined such that the seat initial position $\lambda_{S,init1}$ changes linearly to the ingress/egress assist position $\lambda_{S,end}$ for the seat forward movement time $T_1$, as shown in FIG. 8C.

Referring to a dotted line shown in FIG. 8C, the seat position target value $\lambda_S^*$ may, however, be set such that a rate of change in position at timing immediately after the start of movement from the seat initial position $\lambda_{S,init1}$ and immediately before the completion of movement to the ingress/egress assist position $\lambda_{S,end}$ is smaller than a rate of change in position between the two. This lessens impact on the occupant resulting from acceleration/deceleration of seat movement.

The ingress/egress assist position $\lambda_{S,end}$ of the seat is calculated using expression 14 given in the following. In expression 14, d represents the distance between a central surface of the vehicle main body (a plane that passes through the gravity center of the vehicle main body and the axle of the drive wheel) and the forward end P1 of the stopper 17; M vehicle total weight; and $\theta_{1,init1}$ the vehicle body tilt angle. In addition, $l_1$ represents a gravity center distance of the vehicle main body from the axle, $m_S$ riding section mass, and $m_1$ mass of the vehicle main body (including the riding section).

$$\lambda_{S,end}=(d/2)(M/m_S)-l_1(m_1/m_S)\tan\theta_{1,init1} \qquad \text{(Expression 14)}$$

The main control ECU 21 next determines a drive thrust force command value $S_S$ of the seat for the seat drive actuator 72 (step 43). Specifically, the main control ECU 21 determines the drive thrust force command value $S_S$ of the seat using the previously determined seat position target value $\lambda_S^*$ and expression 15 given below.

In expression 15, $K_{S7}$ and $K_{S8}$ are a feedback gain, for which a value previously determined by, for example, a pole assignment method is used.

$S_{S,f}$ represents a feedforward torque for dry friction resistance, for which a set value is assigned with its positive or negative sign being varied according the movement direction (a negative value for backward movement). An integral gain may be given instead of $S_{S,f}$.

$$S_S=S_{S,f}-K_{S7}(\lambda_S-\lambda_S^*)-K_{S8}(\{\lambda_S\}-\{\lambda_S^*\}) \qquad \text{(Expression 15)}$$

The main control ECU 21 then gives the seat control system 70 the drive thrust force command value $S_S$ determined earlier (step 44). Specifically, the main control ECU 21 supplies the seat control ECU 24 with the drive thrust force command value $S_S$ of the seat previously determined and the seat control ECU 24 supplies the seat drive actuator 72 with a drive voltage corresponding to the drive thrust force command value $S_S$. This causes the seat (riding section 13) to move forwardly toward the seat position target value $\lambda_S^*$.

The main control ECU 21 then determines if the moved seat reaches the ingress/egress assist position (step 45). If the position is yet to be reached (step 45: N), the main control ECU 21 returns to step 41, continuing to move the seat forward.

On determining that the seat has reached the ingress/egress assist position (step 45: Y), the main control ECU 21 stops moving the seat, terminating the ingress/egress standstill control.

In accordance with the embodiment, the seat movement is stopped when the seat reaches the ingress/egress assist position; however, it may be arranged to stop the seat movement also when the occupant turns OFF the egress command switch.

A second embodiment of the present invention will be described below. A vehicle according to the second embodiment includes a balancer (weight body) that is movable in the forward-backward direction of the vehicle. The balancer compensates for part of the effect from parameter errors and disturbance that can cause the vehicle to move due to its inability to maintain balance through tilting of the vehicle main body and movement of the seat during the processes of bringing the vehicle main body to an upstanding position in the raising control (steps 21 through 25) and of tilting the vehicle main body in the ingress/egress standstill control (steps 31 through 36) described with reference to the first embodiment. Specifically, the balancer is used for delicate balance adjustments of the vehicle main body.

This embodiment assumes a balancer having a small weight relative to the gross weight of the vehicle main body. Various types are possible for the balancer, including, for example, (a) a linear motion type; (b) a rotary pendulum type; and (c) a rotary inverted pendulum type.

The balancer is here defined as part of the vehicle main body mass excluding the riding section that can be freely moved in a direction perpendicular to a vehicle body central axis (a straight line passing through the vehicle body gravity center and the center of vehicle body rotation) and a wheel rotation central axis by actuators mounted on the vehicle body.

Figure 9A:
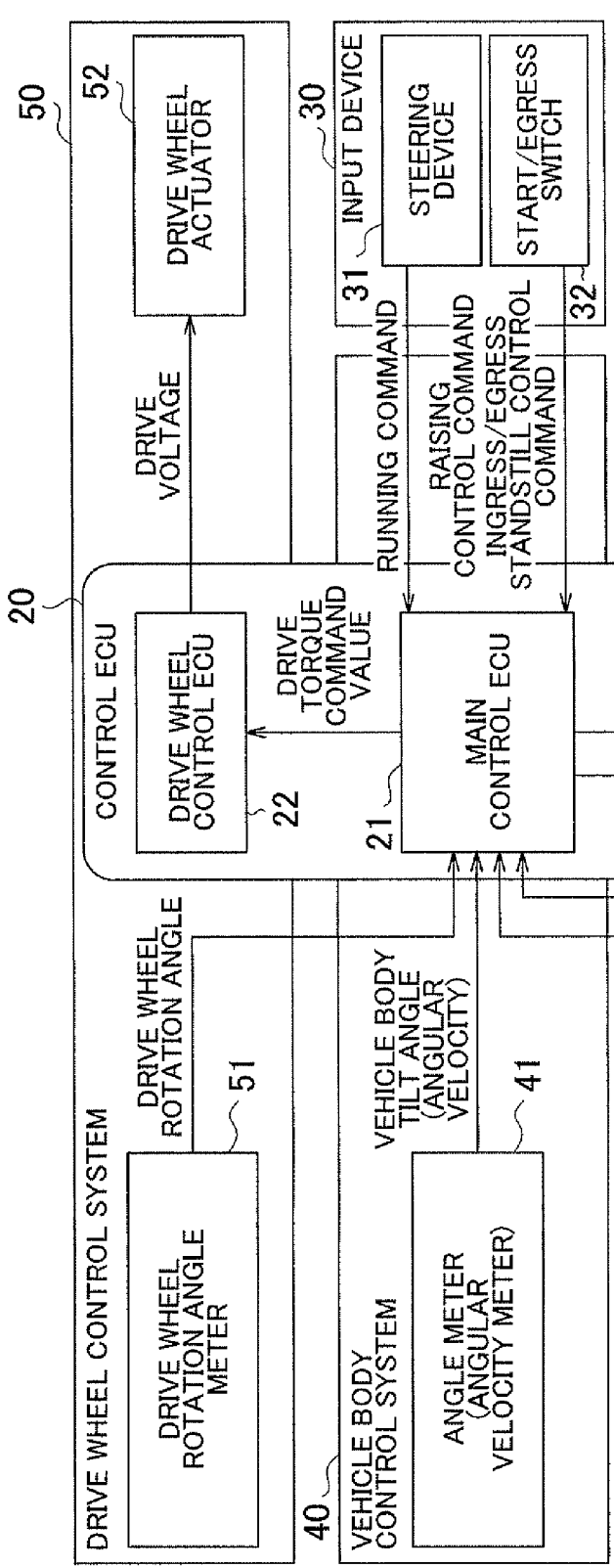
FIGS. 9A and 9B are block diagrams of a control system according to a second embodiment of the present invention.
Figure 9B:
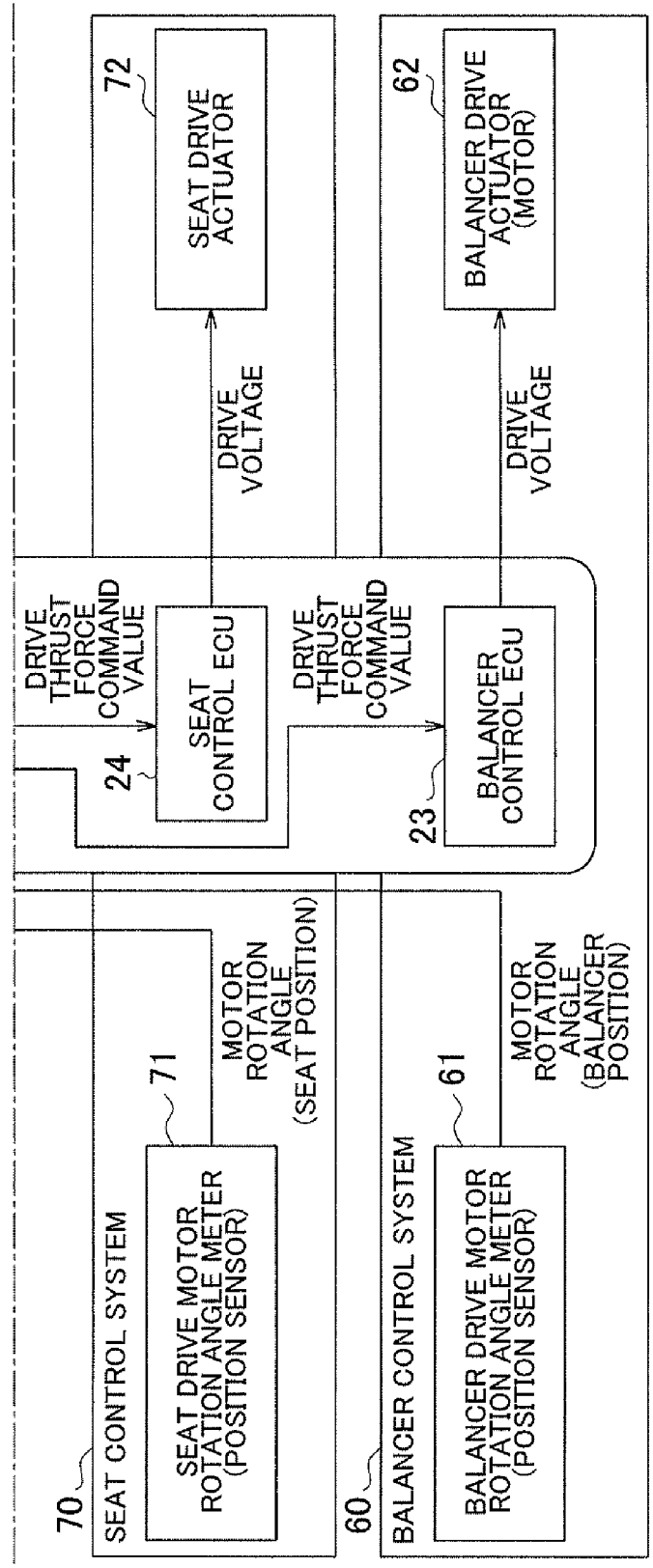

FIGS. 9A and 9B are block diagrams of a control unit of the vehicle according to the second embodiment. Parts that are identical to previously-discussed ones used in the control unit according to the first embodiment shown in FIG. 3 are assigned identical reference numerals and descriptions thereof are omitted as appropriately.

Referring to FIGS. 9A and 9B, the control system according to the second embodiment further includes a balancer control ECU 23, a balancer drive motor rotation angle meter 61, and a balancer drive actuator (motor) 62. The main control ECU 21 is adapted to function, together with these parts, as a balancer control system 60.

The balancer drive motor rotation angle meter (position sensor) 61 supplies the main control ECU 21 with a motor rotation angle corresponding to a balancer position. The main control ECU 21 supplies the balancer control ECU 23 with a drive thrust force command value. The balancer control ECU 23 supplies the balancer drive actuator 62 with a drive voltage corresponding to the drive thrust force command value.

Other arrangements are the same as those of the first embodiment described with reference to FIG. 3.

FIGS. 10A to 10C show exemplary configurations of different balancer movement mechanisms moving a balancer 134 to any desired position. The balancer movement mechanism functions as weight body movement means, forming part of the vehicle main body. The balancer movement mechanism moves the gravity center of the vehicle main body by moving the balancer 134 as the weight body in the forward-backward direction. The balancer 134 is disposed between the riding section 13 and the drive wheel 11. The balancer 134 is structured so as to be movable in the forward-backward direction (in the direction perpendicular to the vehicle body central axis and the wheel rotation central axis) by the balancer drive actuator 62.

The balancer movement mechanism of FIG. 10A according to this embodiment incorporates a slider type actuator 135 that moves the balancer 134 linearly on a slider.

The balancer movement mechanisms shown in FIGS. 10B and 10C are a mechanism incorporating a rotary motion type balancer. The balancer 134 is disposed on a proximal end of a support shaft 136. The support shaft 136 has a distal end to which a rotor of a balancer support shaft motor 137/138 is fixed.

The balancer support shaft motor 137/138 moves the balancer 134 along a circular orbit having a radius of the support shaft 136.

The balancer movement mechanism shown in FIG. 10B includes the balancer support shaft motor 137 disposed at a lower portion of the seat cushion 131, so that the balancer 134 moves on a lower side of the circular orbit.

The balancer movement mechanism shown in FIG. 10C includes the balancer support shaft motor 138 disposed on an axis coaxial with the drive wheel 11, so that the balancer 134 moves on an upper side of the circular orbit.

Another example of the balancer movement mechanism includes an extendable actuator for moving the balancer 134. For example, the balancer movement mechanism may include two extendable actuators; a first end of a first extendable actuator is fixed to a forward portion of the vehicle and a first end of a second extendable actuator is fixed to a backward portion of the vehicle, while a second end of each of the first and second extendable actuators is fixed to the balancer 134. The balancer 134 is moved linearly by extending the first extendable actuator and contacting the second one.

Figure 11:
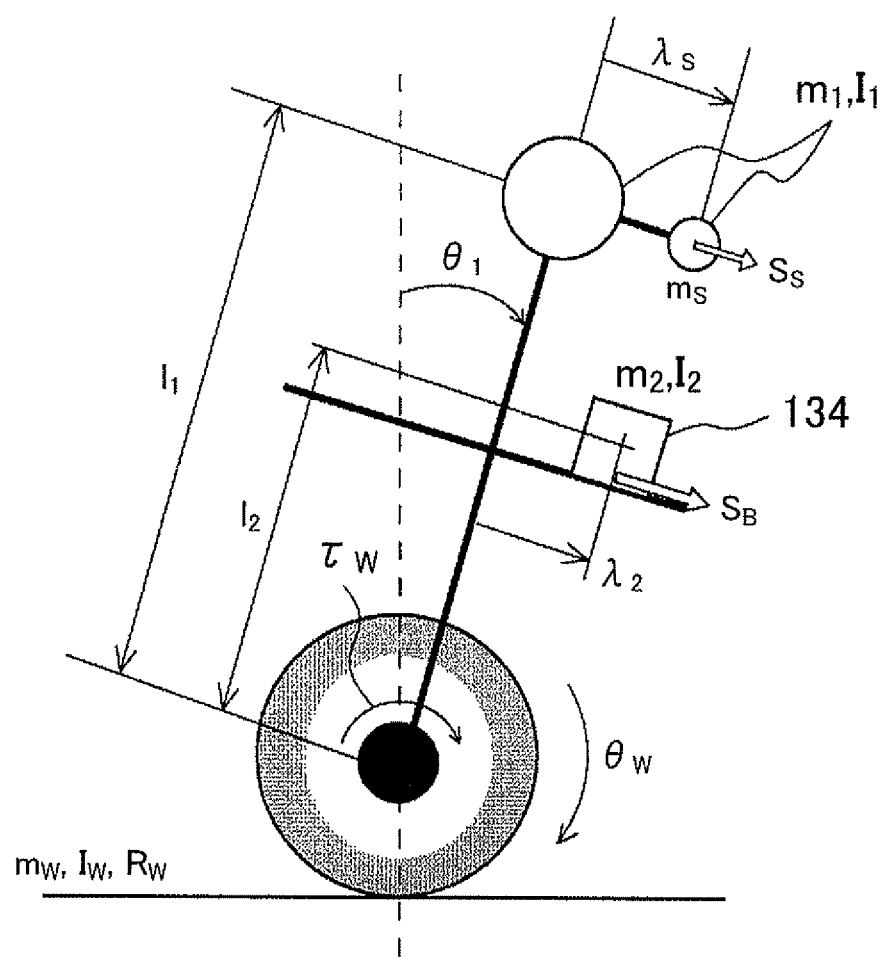
FIG. 11 shows a dynamic model of a vehicle posture control system according to the second embodiment of the present invention.

FIG. 11 shows a dynamic model of a vehicle posture control system including the balancer according to this embodiment. Portions of this dynamic model other than the balancer are applicable to other embodiments. The balancer 134 in FIG. 11 represents the case of FIG. 10A, in which the balancer moves in a direction perpendicular to the axle and vehicle central axis.

Codes used in FIG. 11 have meanings as detailed below.
(a) State Quantities
$\theta_W$: Tire rotation angle [rad]
$\theta_1$: Main body tilt angle (with reference to vertical axis) [rad]
$\lambda_2$: Balancer position (with reference to vehicle body central axis)
$\lambda_S$: Seat position (with reference to vehicle body central axis)
(b) Inputs
$\tau_W$: Drive motor torque (total of two wheels) [Nm]
$S_B$: Balancer drive thrust force [N]
$S_S$: Seat drive force [N]
(c) Parameters
$m_W$: Tire mass [kg]
$R_W$: Tire radius [m]
$I_W$: Tire inertia moment (about axle) [kgm$^2$]
$m_1$: Main body mass (including occupant) [kg]
$l_1$: Main body gravity center distance (from axle) [m]
$I_1$: Main body inertia moment (about gravity center) [kgm$^2$]
$m_2$: Balancer mass [kg]
$l_2$: Balancer reference gravity center distance (from axle) [m]
$I_2$: Balancer inertia moment (about gravity center) [kgm$^2$]
$m_S$: Riding section mass [kg]

Note that the balancer position $\lambda_2$ is positive toward the forward direction of the vehicle (same as the positive direction of the vehicle body tilt angle $\theta_1$).

Raising control and ingress/egress standstill control in the vehicle according to the second embodiment having arrangements as described above will be described below.

Figure 12:
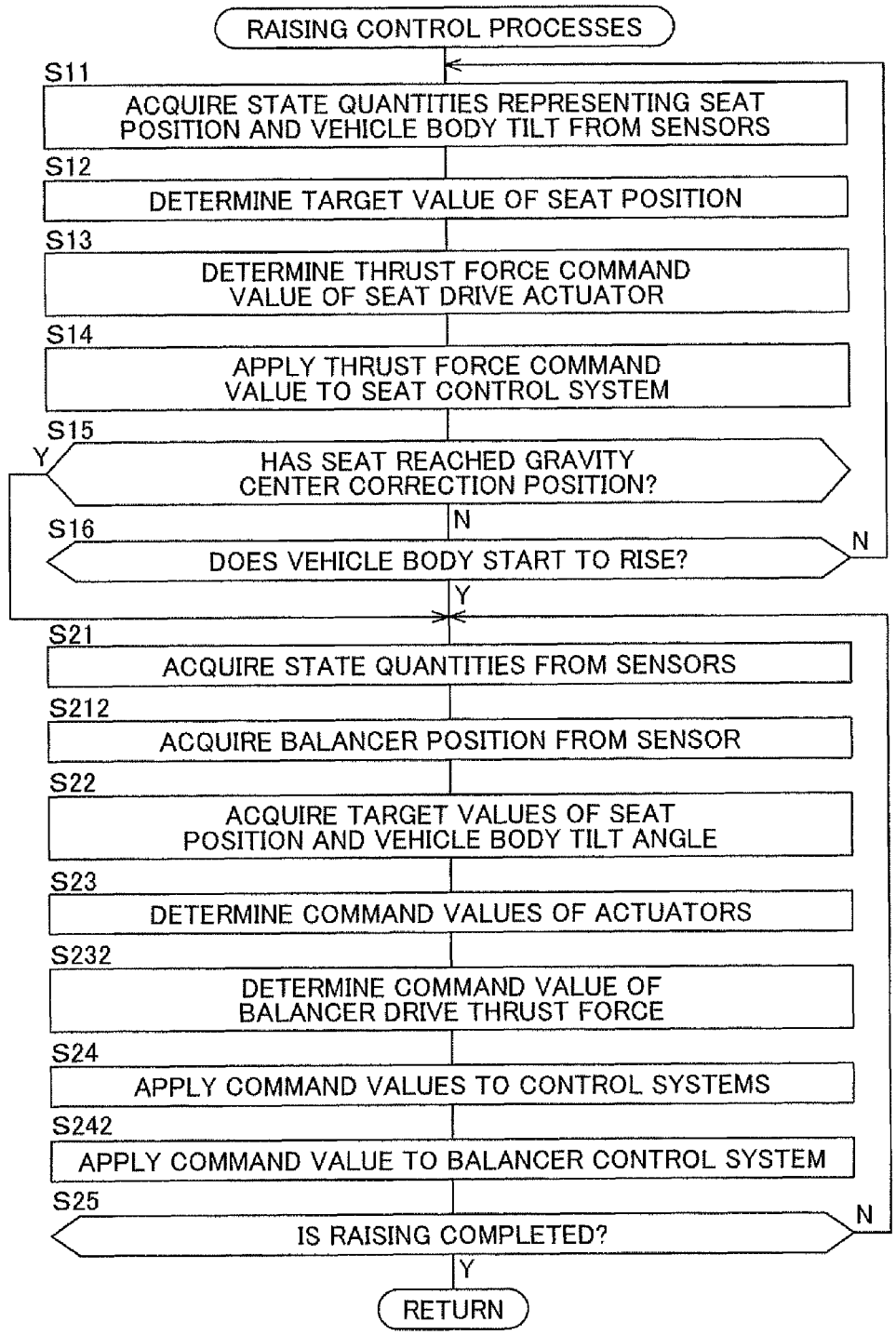
FIG. 12 is a flowchart showing details of processes performed in raising control according to the second embodiment of the present invention.

FIG. 12 is a flowchart showing details of processes performed in the raising control according to the second embodiment. Parts and steps that are identical to previously-discussed ones used in the block diagram and the flowcharts for the first embodiment are assigned identical reference numerals and step numbers, respectively, and descriptions thereof are omitted as appropriately.

In the raising control of the second embodiment, the main control ECU 21 moves the seat (riding section 13) backwardly, as in the first embodiment, after a raising control command is issued in the ingress/egress standstill position (FIG. 1A), thereby moving the gravity center P of the vehicle main body onto a point on the vertical line V that passes through the ground contact point S1 of the drive wheel 11 (FIG. 1B) (steps 11 through 16).

When the gravity center P of the vehicle main body moves onto the ground contact point S1 of the drive wheel 11, the main control ECU 21 acquires the seat position $\lambda_S$, the vehicle body tilt angle $\theta_1$, and the drive wheel rotation angle $\theta_W$ from the sensors (step 21), and also the rotation angle (balancer position $\lambda_2$) from the balancer drive motor rotation angle meter (position sensor) 61 (step 22).

The main control ECU 21 then determines the seat position target value $\lambda_S^*$ using expression 4 and the vehicle body tilt angle target value $\theta_1^*$ using the target value $\lambda_S^*$ found and expression 5, respectively (step 22). Note that the balancer target value is the reference position, specifically, $\lambda_B^*=0$.

The main control ECU 21 then determines, from the target values $\lambda_S^*$ and $\theta_1^*$ of the seat position and vehicle body tilt angle determined above, the drive thrust force command value $S_S$ of the seat using expression 6 and the drive torque command value $\tau_W$ of the drive wheel using expression 7, respectively (step 23).

The main control ECU 21 then determines the drive thrust force command value $S_B$ using expression 16 given below (step 232).

$$S_B = -K_{B1}\theta_W - K_{B2}\{\theta_W\} - K_{B5}\lambda_2 - K_{B6}\{\lambda_2\} \quad \text{(Expression 16)}$$

In expression 16, $K_{B1}$ and $K_{B2}$ are a feedback gain that inhibits movement of the vehicle (rotation of the drive wheel), and $K_{B5}$ and $K_{B6}$ are a feedback gain that controls the position of the balancer. Each of these feedback gains is determined in advance by, for example, a pole assignment method. In expression 16, the feedback gain $K_{B1}$ is given to the rotation angle $\theta_W$ of the drive wheel 11, thereby reducing a steady-state deviation of the drive wheel speed (movement of the vehicle at a constant speed) and minimizing the amount of movement of the vehicle.

The main control ECU 21 then supplies the seat control ECU 24 and the drive wheel control ECU 22 with the command values $S_S$, $\tau_W$ determined earlier (step 24) and the balancer control ECU 23 with the command value $S_B$ determined using expression 16 (step 242). As a result, the drive wheel control ECU 22 supplies the drive wheel actuator 52 with a drive voltage corresponding to the command value $\tau_W$, which causes the vehicle main body to rise. The seat control ECU 24 supplies the seat drive actuator 72 with a drive voltage corresponding to the command value $S_S$, which causes the seat (riding section 13) to move forward.

The balancer control ECU 23 drives the balancer drive actuator 62 with a drive voltage corresponding to the command values $S_B$, to thereby move the balancer, so that deviations in the amount of movement of the gravity center as a result of the raising of the vehicle main body and the forward movement of the seat can be offset to thereby inhibit the vehicle from moving in the forward-backward direction.

The main control ECU 21 then determines if the raising is completed (step 25). If the raising is yet to be completed (step 25: N), the main control ECU 21 returns to step 21 to continue performing the raising control and, if a raised position is reached (step 25: Y), terminates the processes of the raising control according to the embodiment.

Figure 13:
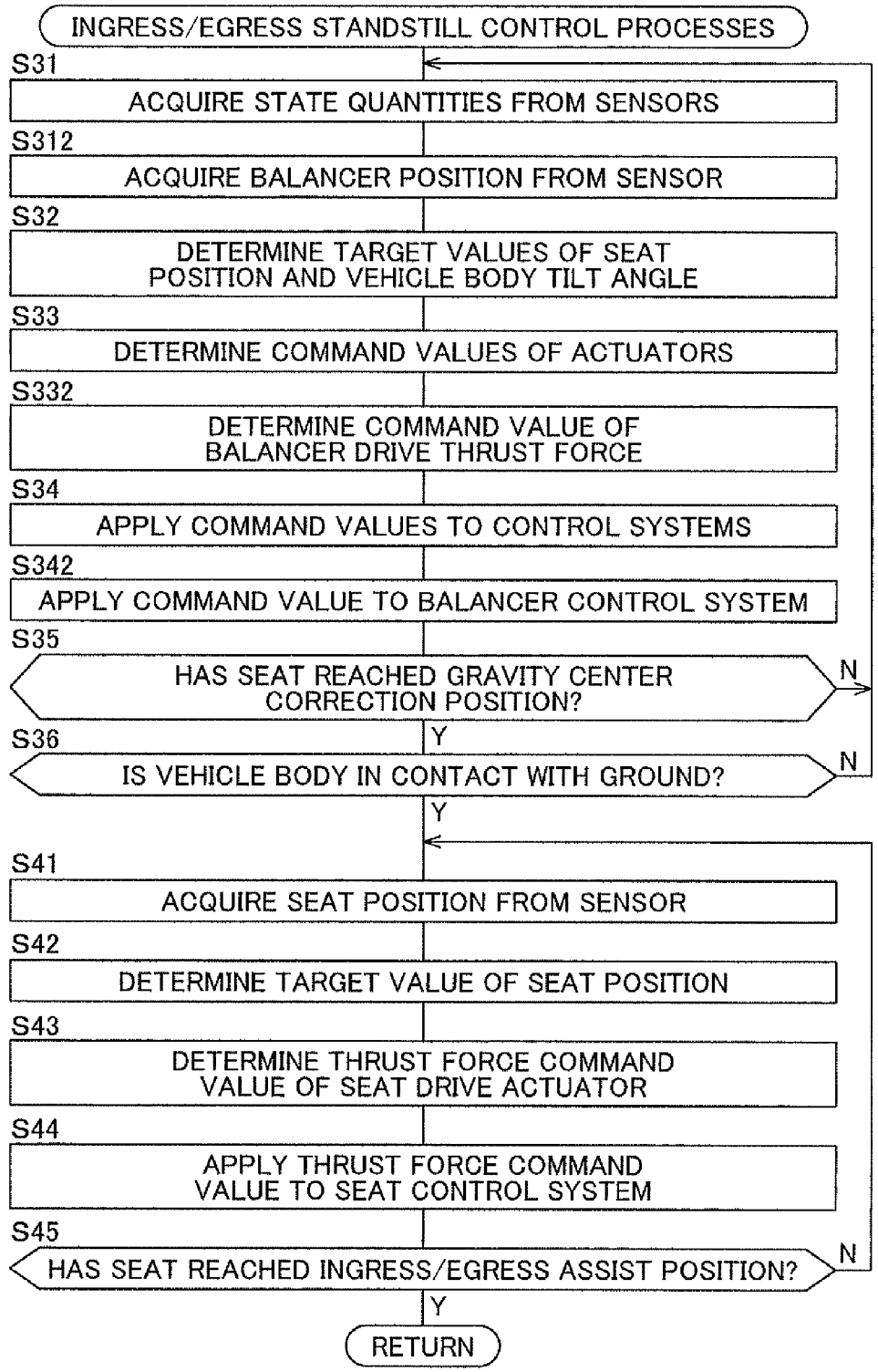
FIG. 13 is a flowchart showing details of processes performed in ingress/egress standstill control according to the second embodiment of the present invention.

Processes of the ingress/egress standstill control in the second embodiment will be described below with reference to a flowchart of FIG. 13. The main control ECU 21 acquires the seat position $\lambda_S$, the vehicle body tilt angle $\theta_1$, and the drive wheel rotation angle $\theta_W$ from the sensors (step 31), and also the balancer position $\lambda_2$ from the balancer drive motor rotation angle meter 61 (step 312). The main control ECU 21 then determines the seat position target value $\lambda_S^*$ using expressions 8 and 9, and the vehicle body tilt angle target value $\theta_1^*$ using expression 10, respectively (step 32). The balancer target position is the reference position ($\lambda_B^*$=0) as in the raising control.

The main control ECU 21 then determines, from the target values $\lambda_S^*$ and $\theta_1^*$ of the seat position and vehicle body tilt angle determined using expressions 8 to 10, the drive thrust force command value $S_S$ of the seat using expression 11 and the torque command value $\tau_W$ of the drive wheel using expression 12, respectively (step 33). The main control ECU 21 further determines the drive thrust force command value $S_B$ of the balancer using expression 16 described with reference to the raising control of the second embodiment (step 332).

The main control ECU 21 then supplies the seat control ECU 24 and the drive wheel control ECU 22 with the command values $S_S$, $\tau_W$ determined earlier (step 34) and the balancer control ECU with the command value $S_B$ determined using expression 16 (step 342).

As a result, the drive wheel control ECU 22 supplies the drive wheel actuator 52 with a drive voltage corresponding to the command value $\tau_W$, which causes the vehicle main body to tilt. The seat control ECU 24 supplies the seat drive actuator 72 with a drive voltage corresponding to the command value $S_S$, which causes the seat (riding section 13) to move backward.

The balancer control ECU 23 drives the balancer drive actuator 62 with a drive voltage corresponding to the command values $S_B$, to thereby move the balancer, so that deviations in the amount of movement of the gravity center as a result of the tilting of the vehicle main body and the backward movement of the seat can be offset, as in the raising, to thereby inhibit the vehicle from moving in the forward-backward direction.

The main control ECU 21 then determines if the seat reaches the gravity center correction position and if the vehicle body is in ground contact (steps 35 and 36). If the seat is yet to reach the gravity center correction position (step 35: N) or the vehicle body is not in ground contact (step 36: N), the main control ECU 21 returns to step 31 and continues performs operations for backward movement of the seat and forward tilt of the vehicle main body.

If, on the other hand, the seat has reached the gravity center correction position (step 35: Y) and the vehicle body is in ground contact (step 36: Y), processes for the egress assist through the loop of from steps 41 through 45 are performed as in the first embodiment.

In accordance with the second embodiment, the balancer is used for delicate balance adjustments of the vehicle main body against, for example, disturbance; however, the balancer may be used as an aid to vehicle gravity center movement during seat movement. For example, when the seat is moved backwardly from the ingress/egress assist position (steps 11 to 16) in the beginnings of the raising control, the balancer is also moved backwardly. This helps reduce the amount of movement of the seat required for gravity center movement, which shortens time required for the raising to complete.

In addition, when, in the ingress/egress standstill control to be described later, the seat is to be moved forwardly from the gravity center correction position (steps 41 to 45), the balancer is moved backwardly. This allows the egress assist position to be shifted further forwardly with the gravity center P of the vehicle main body kept at an intermediate position between the ground contact point S1 of the drive wheel 11 and the ground contact point S2 of the stopper, facilitating ingress and egress on the part of the occupant.

A third embodiment will be described below. In the third embodiment, mass of the riding section 13 (the occupant and the seat) is measured and control parameters are corrected according to the measured value, thereby achieving even more stable raising and ingress/egress standstill controls.

Figure 14:
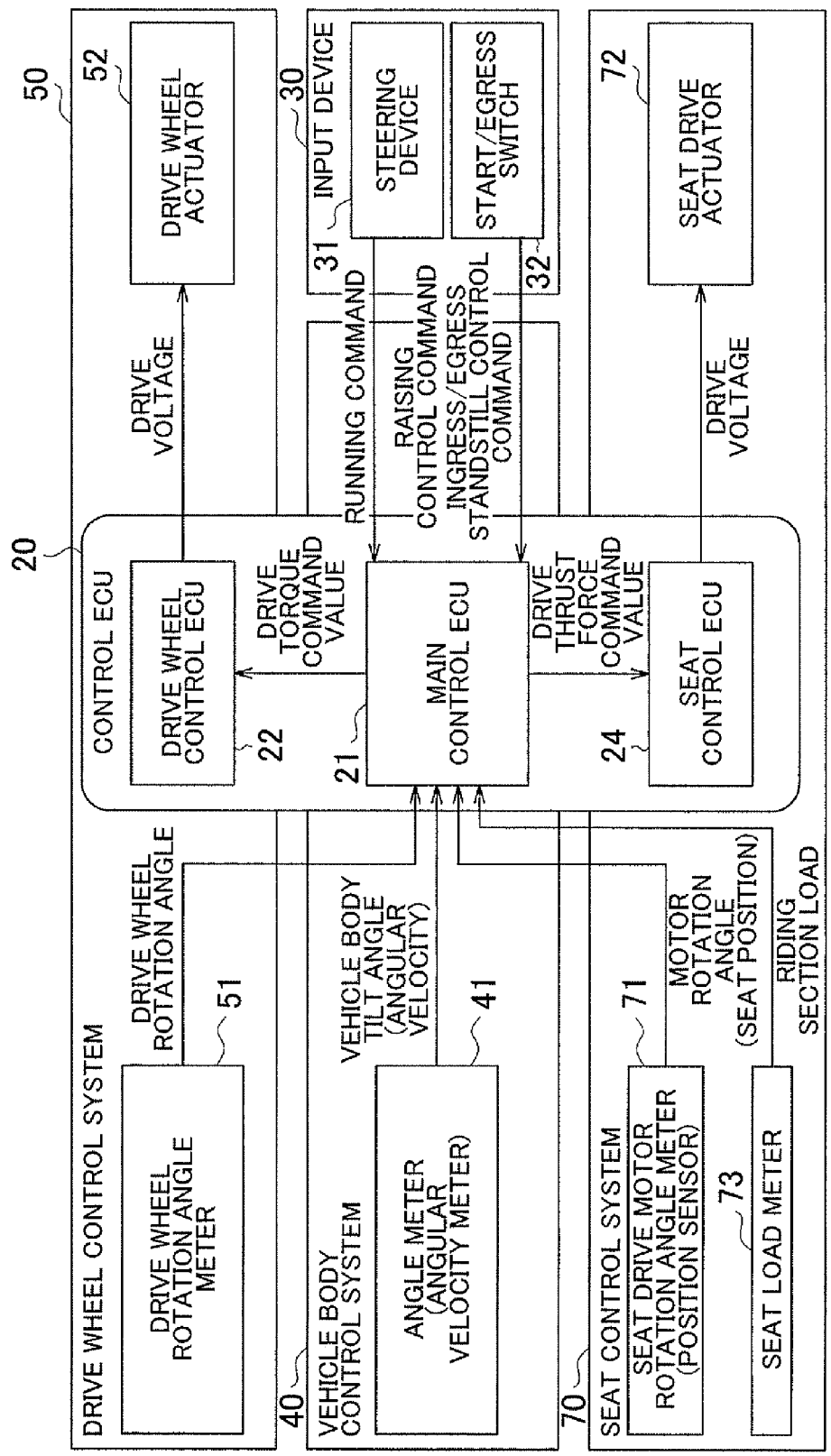
FIG. 14 is a block diagram of a control system according to a third embodiment of the present invention.

FIG. 14 is a block diagram of a vehicle control system according to the third embodiment. Parts that are identical to those used in the control system according to the first embodiment shown in FIG. 3 are assigned identical reference numerals and descriptions thereof are omitted as appropriately.

Referring to FIG. 14, the control system according to the third embodiment includes a seat load meter 73 ("load determination means") as part of the seat control system 70, and detects a riding section load (vertical load) $W_S$ and supplies the main control ECU 21 with the same.

In accordance with the third embodiment, the riding section mass is evaluated by using the load meter. Evaluation may still be made using a discrete measurement method, such as evaluating the mass with a simplified system in a stepwise fashion. Alternatively, the occupant may input his or her mass (weight) him/herself for use in evaluation.

Raising control and ingress/egress standstill control according to the third embodiment having arrangements as described above will be described below. Steps that are identical to those of the raising control and ingress/egress standstill control according to the first embodiment are assigned identical step numbers and descriptions thereof are omitted as appropriately.

Figure 15:
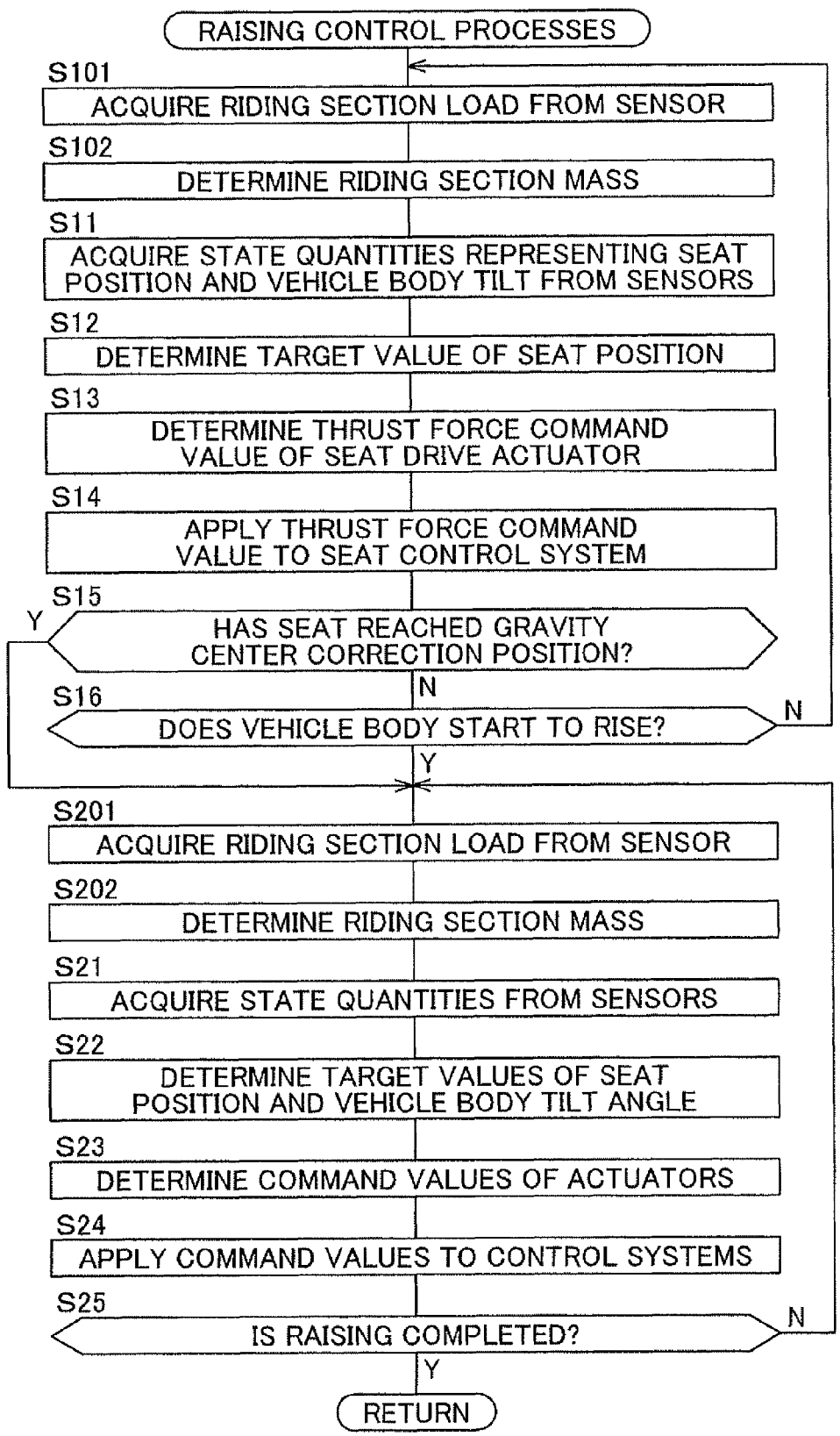
FIG. 15 is a flowchart showing details of processes performed in raising control according to the third embodiment of the present invention.

FIG. 15 is a flowchart showing details of processes performed in the raising control according to the third embodiment.

The main control ECU 21 acquires a vertical load (riding section load $W_S$) acting on the seat from the seat load meter 73 (step 101) and determines the riding section mass $m_S$ using expression 17 given below (step 102).

$$m_S = m_{S,0} + W_S/g \cos\theta_1 \qquad \text{(Expression 17)}$$

In expression 17, $m_{S,0}$ represents a non-variable portion of the riding section mass (mass not dependent on the presence or non-presence of the occupant; e.g. seat); $W_S$ the riding section mass (vertical force) acquired in step 101; g gravitational acceleration; and $\theta_1$ the vehicle body tilt angle.

Note that the riding section mass $m_S$ is mass of portions that can be moved by the seat control system, including not only that of the occupant, but also that of cargoes if the riding section is loaded therewith.

In accordance with this embodiment, a load meter is used to measure the vertical load (component acting perpendicularly on the seat cushion). A load meter capable of measuring also horizontal components may be used. In this case, the riding section mass $m_S$ can be determined without having to use the value of the vehicle body tilt angle $\theta_1$.

A low pass filter may be applied to the riding section mass $m_S$ to be obtained with expressing 17 to thereby remove an RF component. This eliminates vibration of the vehicle body or the seat caused by noise.

A difference from a standard value of the riding section mass (a predetermined value set based on an assumption) should be added also to the mass $m_1$ of the vehicle main body.

In addition, in the beginning (at the start of this control loop), a design value or a value stored in memory at the end of the last ingress/egress standstill control is used for the vehicle body tilt angle $\theta_1$.

This embodiment takes into account an effect from variations in the riding section mass only for the vehicle body weight $m_1$. The effect from variations in the riding section mass may be taken into account also for the vehicle body gravity center distance $l_1$ and make necessary corrections.

In addition, corrected in this embodiment are only those parameters that are directly affected by the variations in the riding section mass. Parameters such as feedback gain may be corrected in consideration of the effect therefrom.

For example, the feedback gain $K_{S7}$ in expressions 3, 6, 11, and 15 may be corrected according to expression 18 given in the following.

In expression 18, code [x] represents a standard value of x.

$$K_{S7}=(m_S/[m_S])[K_{S7}] \quad \text{(Expression 18)}$$

After having determined the riding section mass $m_s$ using expression 17, the main control ECU 21 performs processes of from steps 11 through 16 in the same manner as in the first embodiment.

Note, however, that, in expression 2 for determining the gravity center correction position $\lambda_{S,n}$ to be used in expression 1, the value of the riding section mass $m_S$ (and the vehicle body mass $m_1$) determined in step 102 is used.

When the gravity center P of the vehicle main body moves to a point on the vertical line passing through the ground contact point S1 of the drive wheel 11, the main control ECU 21 acquires, as in steps 101 and 102, the vertical load (riding section load $W_S$) acting on the seat from the seat load meter 73 (step 201) and determines the riding section mass $m_S$ using the expression 17 (step 202).

Having determined the riding section mass $m_S$ using expression 17, the main control ECU 21 performs processes of from steps 21 through 25, as in the first embodiment.

Note, however, that, in expression 5 for determining the vehicle body tilt angle target value $\theta_1{}^*$, the value of the riding section mass $m_S$ (and the vehicle body mass $m_1$) determined in step 202 is used.

Figure 16:
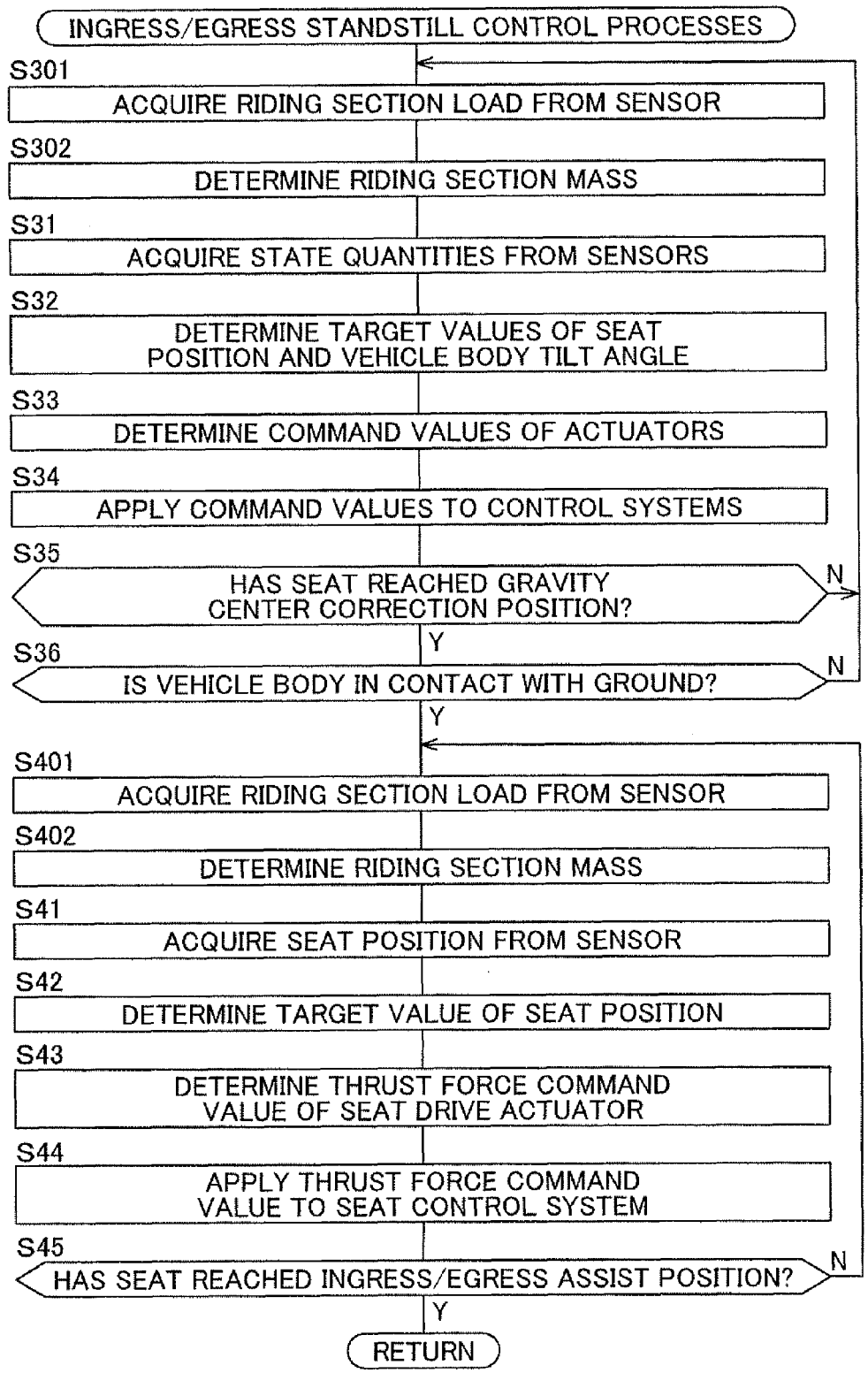
FIG. 16 is a flowchart showing details of processes performed in ingress/egress standstill control according to the third embodiment of the present invention.

The ingress/egress standstill control in the third embodiment will be described below with reference to FIG. 16.

The main control ECU 21 acquires, as in steps 101 and 102 in the raising control, the vertical load (riding section load $W_S$) acting on the seat from the seat load meter 73 (step 301) and determines the riding section mass $m_S$ using the expression 17 (step 302).

Having determined the riding section mass $m_S$, the main control ECU 21 performs processes of from steps 31 through 36, as in the first embodiment.

Note, however, that, in the expression (expression 9) for determining the gravity center correction position $\lambda_{S,n}$ used in expression 8 and expression 10 for determining the vehicle body tilt angle target value $\theta_1{}^*$, the value of the riding section mass $m_S$ (and the vehicle body mass $m_1$) determined in step 302 is used.

When processes of the loop of from steps 301 through 36, through which the ingress/egress standstill position is achieved from the inverted position, is completed, the main control ECU 21 acquires, as in steps 301 and 302, the vertical load (riding section load $W_S$) acting on the seat from the seat load meter 73 (step 401) and determines the riding section mass $m_S$ using the expression 17 (step 402).

Having determined the riding section mass $m_S$ using expression 17, the main control ECU 21 performs processes of from steps 41 through 45, as in the first embodiment.

Note, however, that, in the expression (expression 14) for determining the ingress/egress assist position $\lambda_{S,end}$ used in expression 13, the value of the riding section mass $m_S$ (and the vehicle body mass $m_1$) determined in step 402 is used.

The embodiment has been described that the riding section load is acquired every time within the control loop in order to respond to a case, in which the riding section mass changes halfway in the middle of the raising control and the ingress/egress standstill control described with reference to FIGS. 15 and 16. The load may, however, be measured only once prior to the start of the control loop. In this case, control stability can be enhanced, though changes in the mass during the control cannot be responded to.

A fourth embodiment will be described below. The third embodiment has been described that the value of the riding section mass $m_S$ (and the vehicle body mass $m_1$) is calculated using expression 17 based on the measured value taken on the seat load meter 73. In the fourth embodiment, the mass of the riding section is estimated and, according to the estimated value, the control parameter is corrected. The riding section mass is estimated by, for example, a state observer. A control system according to the fourth embodiment is the same as that of the first embodiment shown in FIG. 3.

Figure 17:
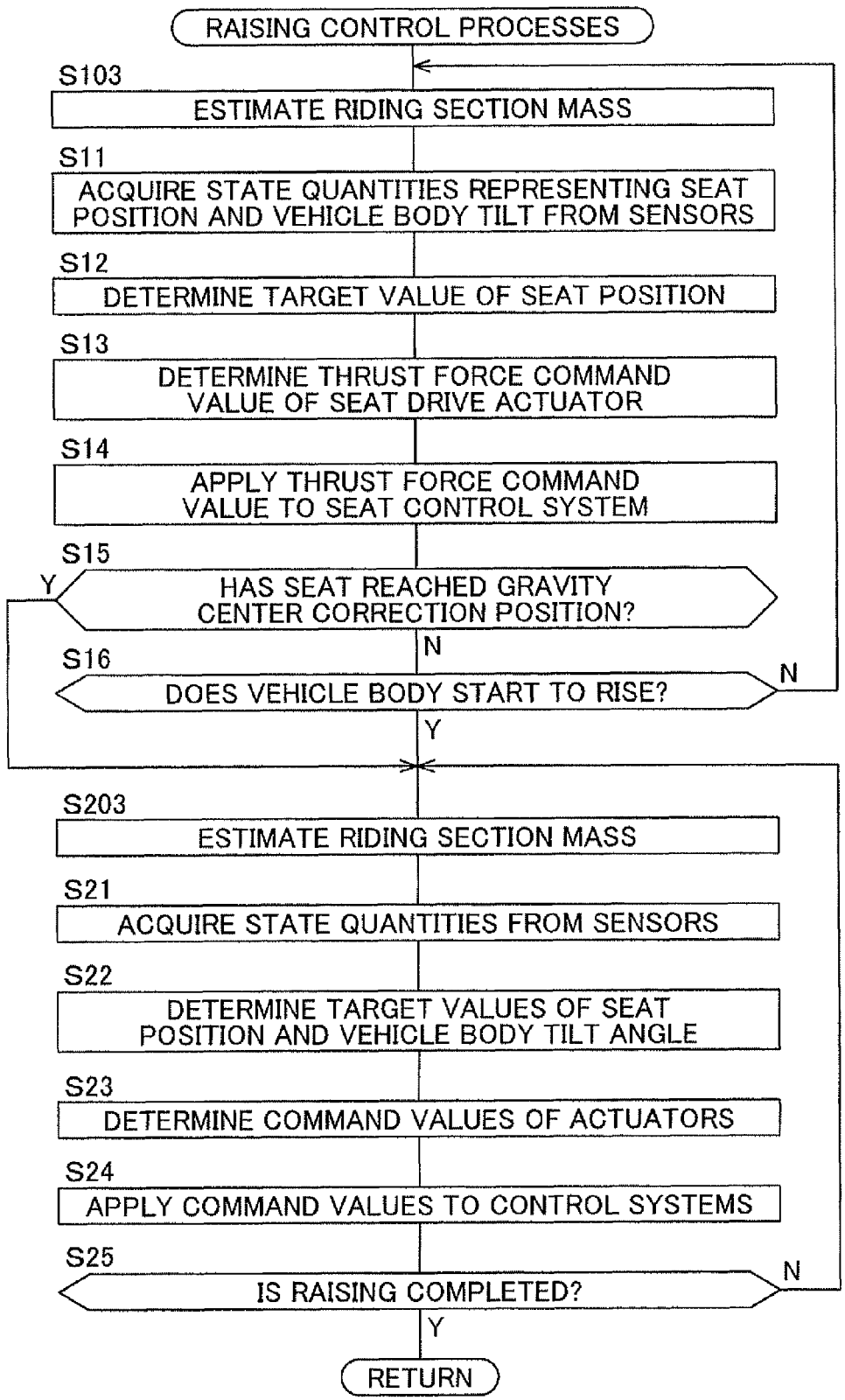
FIG. 17 is a flowchart showing details of processes performed in raising control according to the fourth embodiment of the present invention.

FIG. 17 is a flowchart showing details of processes performed in raising control according to the fourth embodiment. The main control ECU 21 first estimates the riding section mass (step 103). Specifically, the main control ECU 21 estimates the riding section mass $m_S$ using expression 19 given below representing a seat movement model based on a status of seat movement. In expression 19, $S_{S,f0}$ represents dry friction, for which a predetermined value is used.

Further, g represents gravitational acceleration and $C_S$ viscous friction coefficient relative to seat movement.

At the start of this control loop (steps 101 through 16), a predetermined standard value is assigned for the riding section mass as an initial value of the observer.

$$m_S=(-S_S \pm S_{S,f0}+C_S\{\lambda_S\})/g \sin \theta_1 \quad \text{(Expression 19)}$$

In expression 19, for example, the greater the thrust force $S_S$ required for seat movement, the greater the riding section mass $m_S$ estimated at a constant seat movement speed $\{\lambda_S\}$. The seat movement model of expression 19 does not consider inertia and assumes a constant dry friction value not dependent on weight. The riding section mass $m_S$ may nonetheless be estimated using an even more detailed model that strictly takes into consideration the above-mentioned factors. A low pass filter may be applied to the riding section mass $m_S$ to be obtained with expressing 19 to thereby remove an RF component. This stabilizes the observer and eliminates vibration of the vehicle body or the seat caused by noise.

Having estimated the riding section mass $m_S$ using expression 19, the main control ECU 21 performs processes of from steps 11 to 16, as in the first embodiment.

Note that, in expression 2 for determining the gravity center correction position $\lambda_{S,n}$ used in expression 1, the value of the riding section mass $m_S$ (and the vehicle body mass $m_1$) estimated in step 103 is used.

When the gravity center P of the vehicle main body moves to a point on the vertical line passing through the ground contact point S1 of the drive wheel 11, the main control ECU 21 again determines the riding section mass $m_S$ (step 203). Specifically, the main control ECU 21 estimates the riding section mass $m_S$ using a vehicle body tilt model of expression 20 based on the vehicle body tilt position ($\theta_1$). In expression 20, $m_C$ represents a non-variable portion of the vehicle body weight, expressed by $[m_1]-[m_S]$. Code [x] represents a standard value of x. At the start of this control loop (steps 203 through 25), a predetermined standard value is assigned for the riding section mass as an initial value of the observer.

$$m_S=((\tau_W/g)-m_C l_1 \sin \theta_1)/(l_1 \sin \theta_1 + \lambda_S \cos \theta_1) \quad \text{(Expression 20)}$$

In expression 20, for example, the greater the torque $\tau_W$ required for raising the vehicle body, the greater the riding section mass $m_S$ estimated at a constant vehicle body tilt angle $\theta_1$ and seat position $\lambda_S$. The vehicle body tilt model of expression 20 does not consider inertia or friction. The riding section mass $m_S$ may nonetheless be estimated using an even more detailed model that strictly takes into consideration the above-mentioned factors. Alternatively, estimation may also be made from another dynamic system, such as rotation of the drive wheel.

A low pass filter may be applied to the riding section mass $m_S$ to be obtained with expressing 20 to thereby remove an RE component. This stabilizes the observer and inhibits vibration of the vehicle body or the seat caused by noise.

Having estimated the riding section mass $m_S$ using expression 20, the main control ECU 21 performs processes of from steps 21 to 26, as in the first embodiment.

Note that, in expression 5 for determining the vehicle body tilt angle target value $\theta_1^*$, the value of the riding section mass $m_S$ (and the vehicle body mass $m_1$) estimated in step 203 is used.

FIG. 18 is a flowchart showing details of processes performed in ingress/egress standstill control according to the fourth embodiment of the present invention.

The main control ECU 21 first estimates the riding section mass (step 303). The vehicle body tilt model of expression 20 described in the raising control of the fourth embodiment is used for this estimation.

The main control ECU 21 then performs processes of from steps 31 through 36, as in the first embodiment.

Note, however, that, in the expression (expression 9) for determining the gravity center correction position $\lambda_{S,n}$ used in expression 8 and the expression for determining the vehicle body tilt angle target value $\theta_1^*$ in expression 10, the value of the riding section mass $m_S$ (and the vehicle body mass $m_1$) estimated in step 303 is used.

When processes of the loop of from steps 303 through 36, through which the ingress/egress standstill position is achieved from the inverted position, is completed, the main control ECU 21 determines the riding section mass $m_S$ (step 403). The seat movement model of expression 19 described in the raising control of the fourth embodiment is used for this estimation.

The main control ECU 21 then performs processes of from steps 41 to 45, as in the first embodiment.

Note, however, that, in the expression (expression 14) for determining the ingress/egress assist position $\lambda_{S,end}$ used in expression 13, the value of the riding section mass $m_S$ estimated in step 403 is used.

In the raising control and the ingress/egress standstill control of the fourth embodiment described heretofore, the riding section mass $m_S$ is estimated within the same loop (cycle) as the control loop. The estimation may still be made in another loop (cycle). If, for example, a large volume of calculation is involved, the cycle of estimate calculation may be enlarged.

In accordance with the fourth embodiment, the riding section mass $m_S$ is estimated using the observer based on the dynamic model. An even simpler method may, nonetheless, be used. For example, in place of expression 19, a minimum thrust force required for moving the seat, measured in relation to the riding section mass $m_S$ is stored in memory as a map and the estimation may be made using this map.

In the third embodiment and the fourth embodiment described heretofore, the riding section mass $m_S$ in the first embodiment is determined through measurement and estimation, respectively. The riding section mass $m_S$ determined and estimated, respectively, in the third embodiment and the fourth embodiment may be used in the second embodiment.

In each of the embodiments mentioned above, the direction in which the vehicle main body is tilted is forward in the ingress/egress standstill position of the vehicle. The tilt direction may be backward, if, for example, the riding section has only the seat cushion with no seat back, or the vehicle is structured to have no seat cushion, either, and such that the occupant gets on the vehicle from the backward direction.

The invention claimed is:

1. An inverted pendulum vehicle comprising:
   a vehicle body that includes a riding section and a vehicle main body;
   means for controlling torque of a drive wheel according to tilt of the vehicle body and rotation of a drive wheel;
   a limiting mechanism having a leading end portion that is in ground contact when the vehicle is in an ingress/egress standstill position at which the occupant gets on and off the seat, to thereby limit a tilt angle of the vehicle body;
   a riding section movement mechanism moving the riding section relative to the vehicle main body; and
   raising control means for raising the vehicle body, while moving the riding section with the riding section movement mechanism such that the center of gravity of the vehicle body is positioned on a vertical line that passes through a ground contact point of the drive wheel, and
   wherein, in starting from the ingress/egress standstill position with the tilt angle of the vehicle body limited by the limiting mechanism, the raising control means moves the riding section until the center of gravity of the vehicle body is positioned on the vertical line that passes through the ground contact point of the drive wheel and then starts raising the vehicle body, and
   wherein, to establish the ingress/egress standstill position, the raising control means tilts the vehicle body forward until the leading end portion of the limiting mechanism contacts the ground and the riding section movement mechanism moves the riding section forward so that the center of gravity of the vehicle body is located forward of the vertical line that passes through the ground contact point of the drive wheel.

2. The inverted pendulum vehicle according to claim 1, wherein:
   the raising control means determines, with a change in the tilt angle of the vehicle body, whether or not the riding section has moved to position the center of gravity of the vehicle body on the vertical line that passes through the ground contact point of the drive wheel.

3. The inverted pendulum vehicle according to claim 1, wherein:
   the raising control means determines a riding section target position for the riding section and a vehicle body tilt angle target value for the vehicle body according to time elapsed from the start of raising, and performs feedback control of a movement of the riding section according to the riding section target position and feedback control of the tilt of the vehicle body according to the vehicle body tilt angle target value.

4. The inverted pendulum vehicle according to claim 3, wherein:
   the raising control means determines the riding section target position and the vehicle body tilt angle target value such that the speed of raising at the start and completion of raising is lower than the speed of raising between the start and completion of the raising.

5. The inverted pendulum vehicle according to claim 3, further comprising:

load determination means for determining the load acting on the riding section;

wherein the riding section target position is determined according to the determined load.

6. The inverted pendulum vehicle according to claim 5, wherein:

the load determination means regards, as the load acting on the riding section, a value measured by a load meter mounted on the riding section or a value estimated by a state observer that uses at least one of the movement of the riding section, the tilted position of the vehicle body, and the rotation of the drive wheel.

7. The inverted pendulum vehicle according to claim 1, wherein:

an ingress/egress standstill control means determines a riding section target position for the riding section and a vehicle body tilt angle target value for the vehicle body according to time elapsed from the start of tilting for the ingress/egress standstill, and performs feedback control of movement of the riding section according to the riding section target position and feedback control of the tilt of the vehicle body according to the vehicle body tilt angle target value.

8. The inverted pendulum vehicle according to claim 1, wherein:

an ingress/egress standstill control means determines the ingress/egress standstill position when a vehicle body tilt angular velocity is equal to or less than a predetermined threshold value.

\* \* \* \* \*